United States Patent [19]

Tanaka

[11] Patent Number: 4,745,481
[45] Date of Patent: May 17, 1988

[54] SOLIDSTATE IMAGING DEVICE

[76] Inventor: Shoichi Tanaka, 305, CI Hongou, 2-37, Kamiyashro, Meitouku, Nagoyashi, Aichken, 465, Japan

[21] Appl. No.: 787,798

[22] PCT Filed: Jan. 30, 1985

[86] PCT No.: PCT/JP85/00038

§ 371 Date: Nov. 12, 1985

§ 102(e) Date: Nov. 12, 1985

[87] PCT Pub. No.: WO85/03398

PCT Pub. Date: Aug. 1, 1985

[30] Foreign Application Priority Data

| Jan. 30, 1984 | [JP] | Japan | 59-15950 |
| Mar. 14, 1984 | [JP] | Japan | 59-49685 |
| May 8, 1984 | [JP] | Japan | 59-91417 |
| May 12, 1984 | [JP] | Japan | 59-95314 |
| Sep. 10, 1984 | [JP] | Japan | 59-189970 |
| Oct. 9, 1984 | [JP] | Japan | 59-211797 |

[51] Int. Cl.$^4$ .............................. H04N 3/14
[52] U.S. Cl. ................ 358/213.29; 358/213.22
[58] Field of Search ............. 358/212, 209, 213.23, 358/213.26, 213.22, 213.29, 213.31; 357/24 LR

[56] References Cited

U.S. PATENT DOCUMENTS

| 4,319,279 | 3/1982 | Bergen et al. | 357/241 R |
| 4,455,575 | 6/1984 | Murakoshi | 358/213 |
| 4,472,741 | 9/1984 | Takatsu et al. | 358/213 |
| 4,499,496 | 2/1985 | Tanaka et al. | 358/213 |
| 4,553,167 | 11/1985 | Kinoshita | 358/213 |
| 4,566,037 | 1/1986 | Takatsu et al. | 358/213 |

Primary Examiner—Jin F. Ng
Assistant Examiner—Stephen Brinich

[57] ABSTRACT

The present invention relates to CCD area sensors. The object of the invention is to remove the problem which stems from the fact that the charge transfer function of the vertical CCD(6) restricts the performance of the CCD area sensor. According to the CCD area sensor of the present invention, the fundamental feature resides in that the clocked transfer electrode 3(Z to U) of the vertical CCD(6) are driven by dissimilar clock voltages in order to independently transfer the signal charge packets of the whole potential wells of the vertical CCD(6), that the empty potential well is injected from the output terminal of the vertical CCD(6), and that the next empty potential well is injected from said output terminal before the empty potential well that was previously injected before reaches the opposite end of the output terminal of the vertical CCD(6).

5 Claims, 23 Drawing Sheets

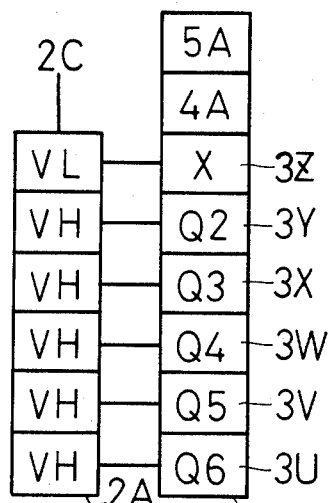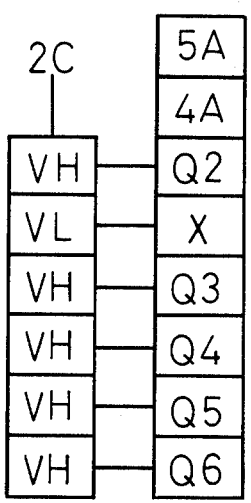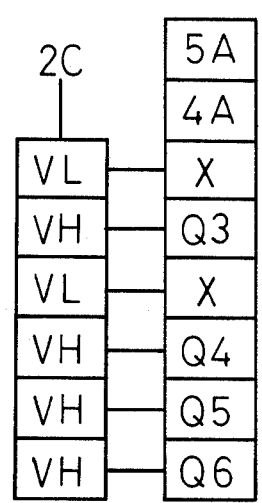
FIG.3A  FIG.3B  FIG.3C
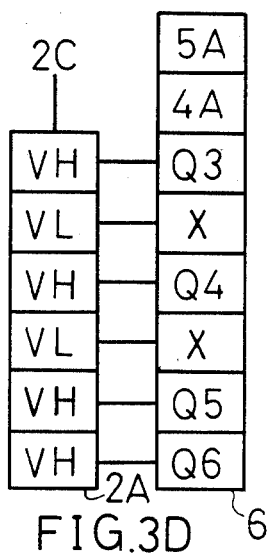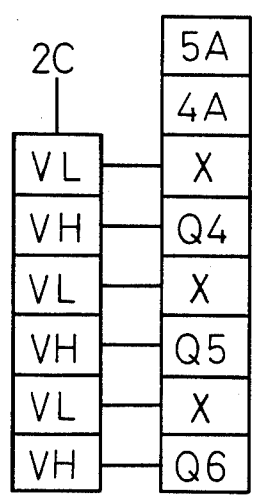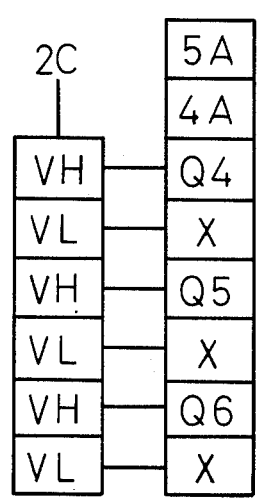
FIG.3D  FIG.3E  FIG.3F

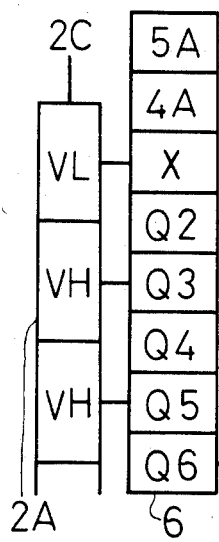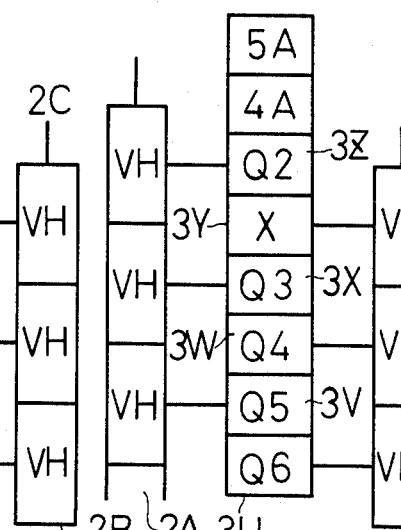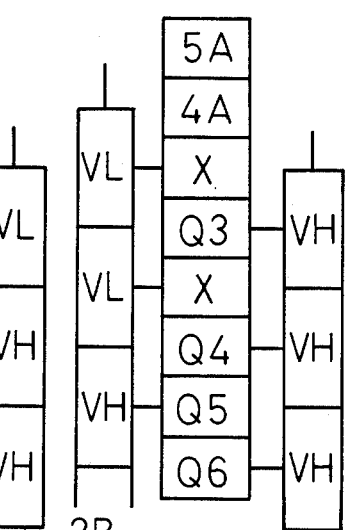
FIG.4A  FIG.4B  FIG.4C
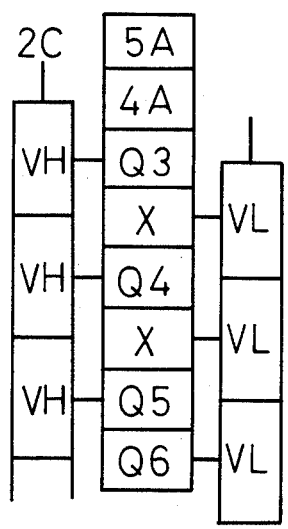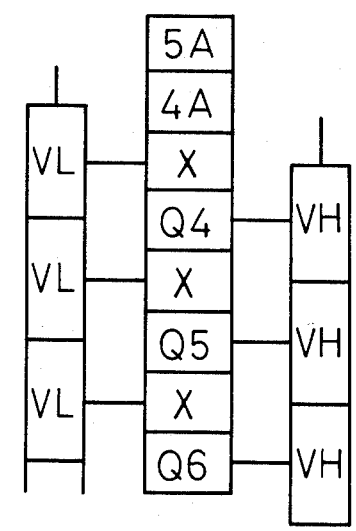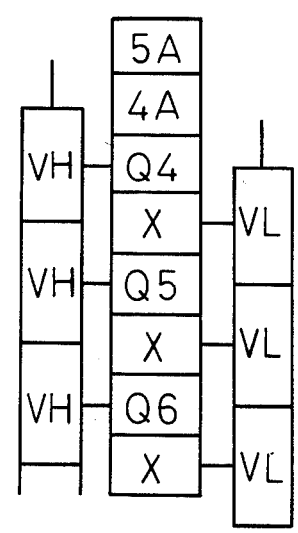
FIG.4D  FIG.4E  FIG.4F

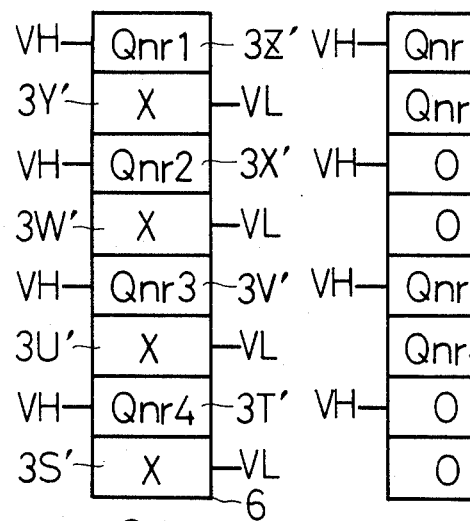
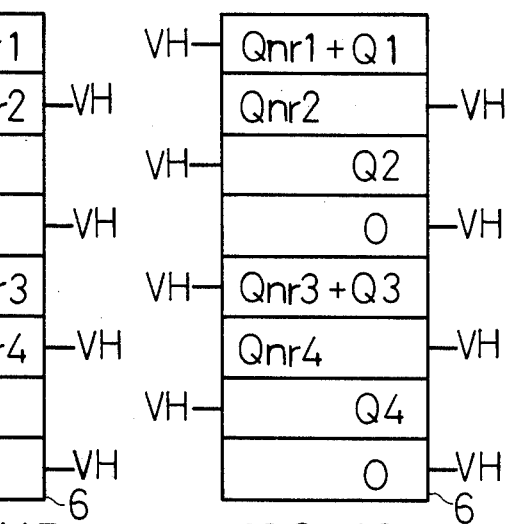
FIG.11A  FIG.11B  FIG.11C
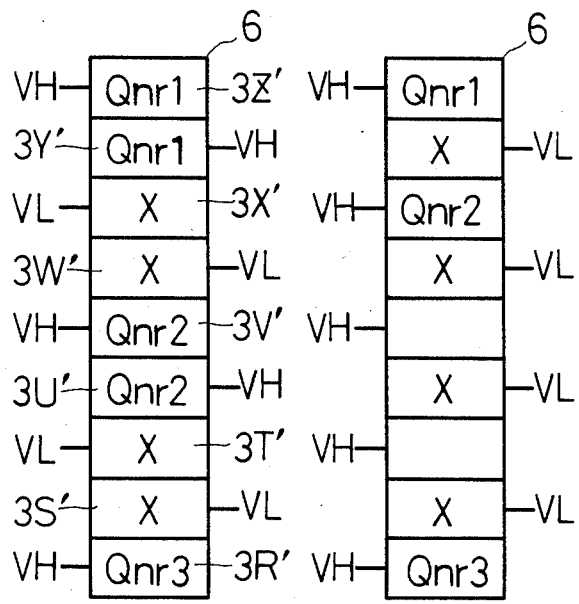
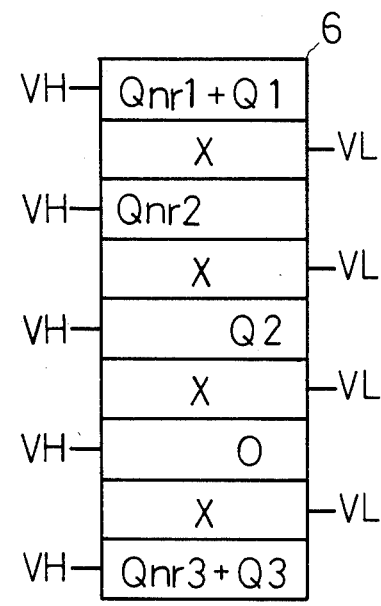
FIG.11D  FIG.11E  FIG.11F

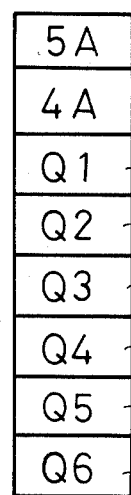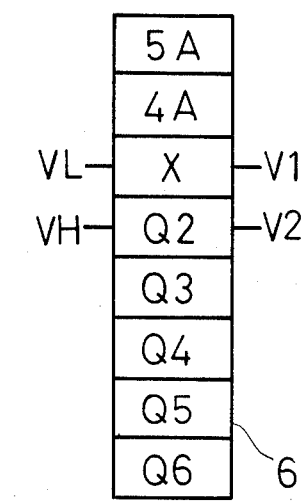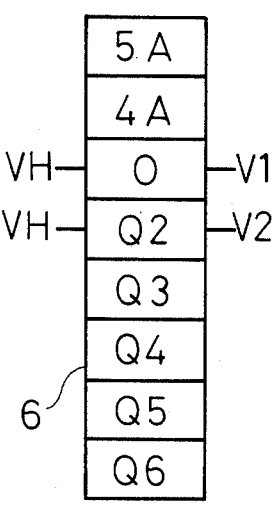
FIG.16A (T1)   FIG.16B (t1)   FIG.16C (t2)
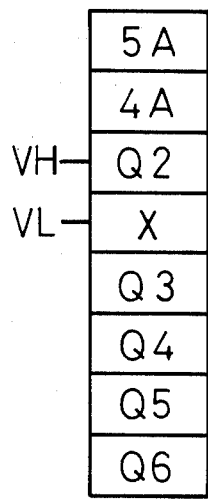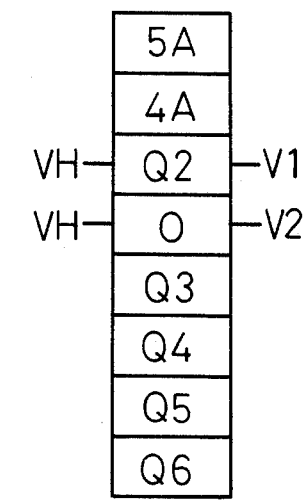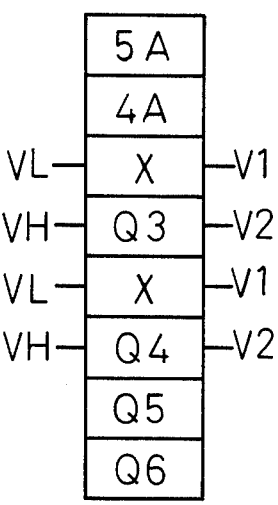
FIG.16D (t3)   FIG.16E (t4)   FIG.16F (t5)

(t6)

(t7)

(t8)

(t9)

(t10)

(t11)

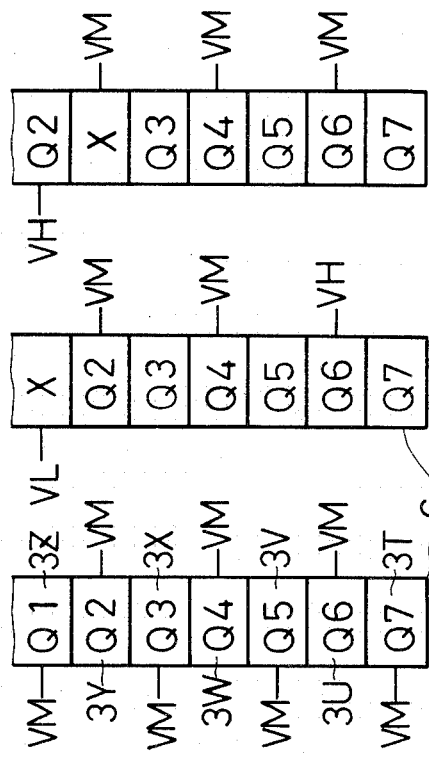
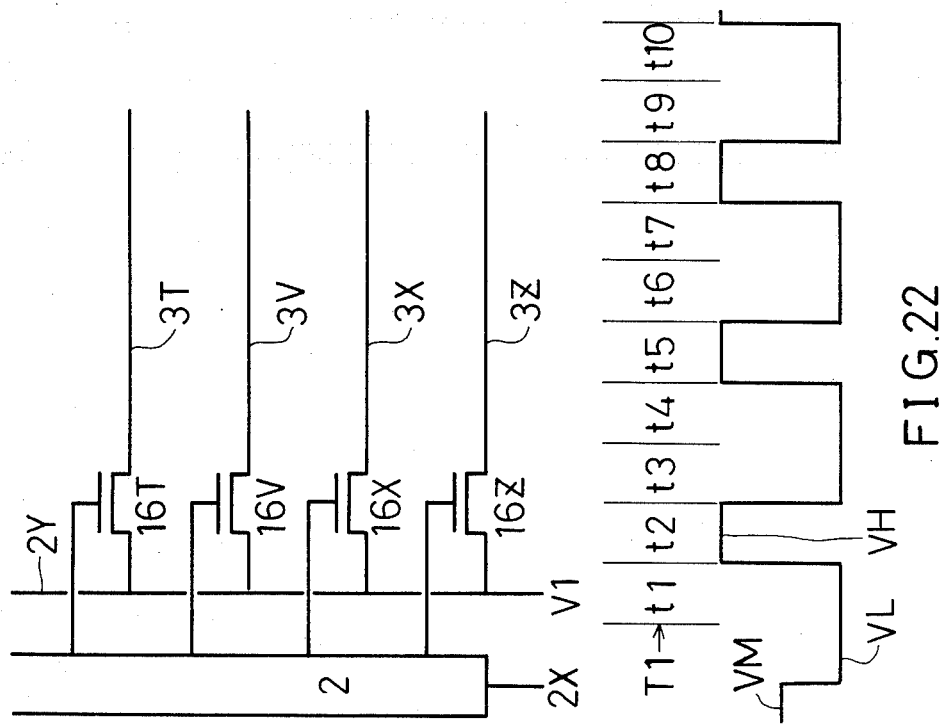

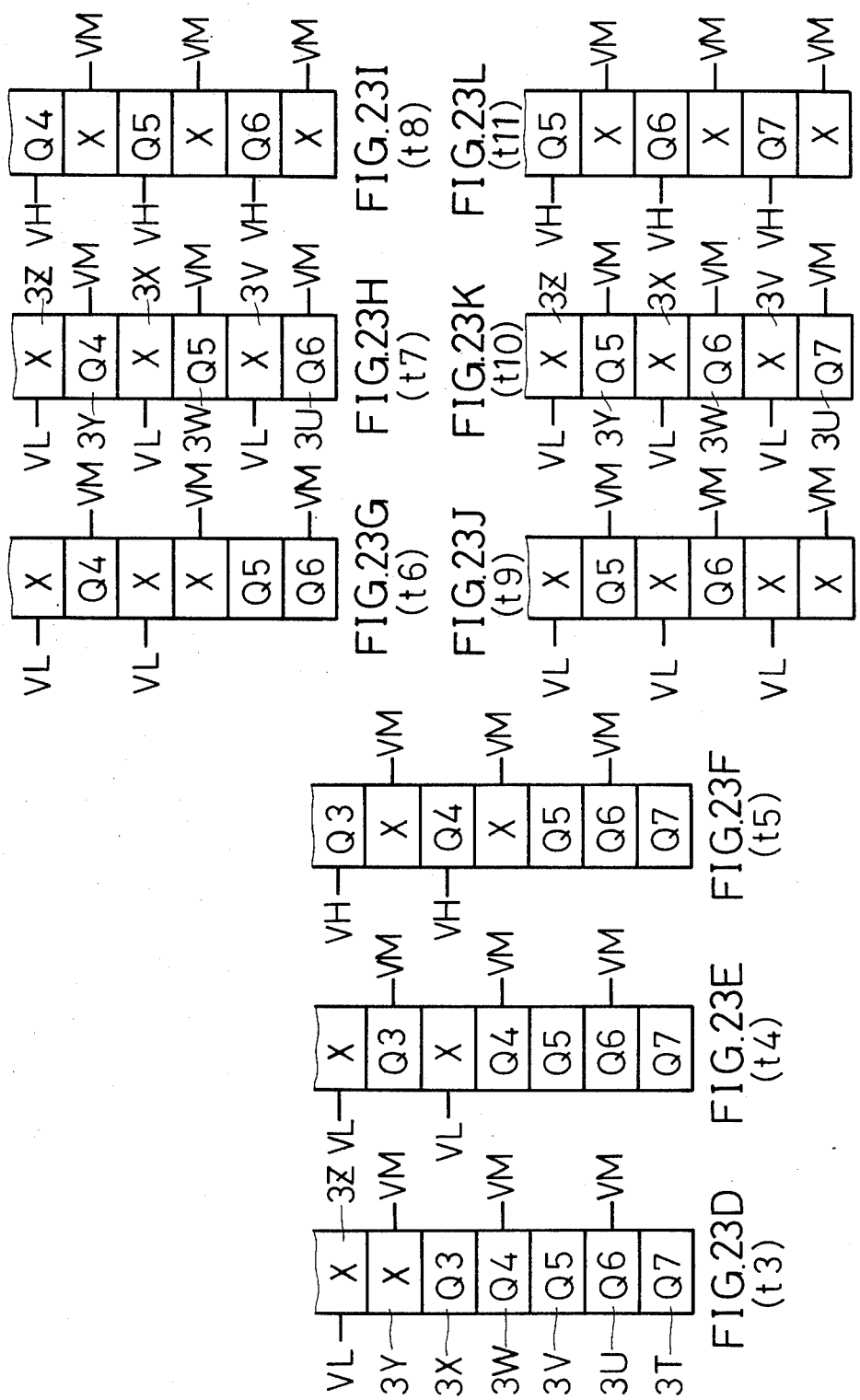

FIG.24
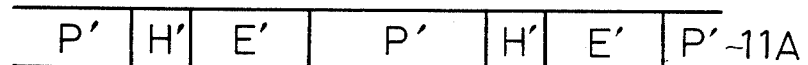
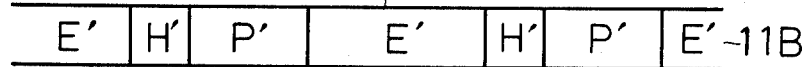
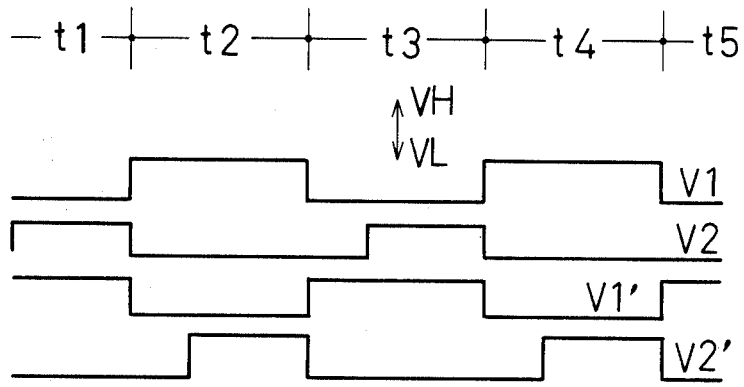

SOLIDSTATE IMAGING DEVICE

BACKGROUND OF THE INVENTION

1. Field of the Invention

The present invention relates to a solidstate imaging device and, in particular, to a CCD imaging device.

2. Background Art

On the CCD area sensor, many types are well known. The CCD area sensor of which a vertical CCD combines a picture cell column, is called the frame transfer CCD area sensor, (the frame transfer sensor for short). The frame transfer sensor having a buffer CCD between the vertical CCDs and a horizontal CCD is called the buffer frame transfer sensor. And, the buffer CCD accumulates signal charge packets of one TV field. The frame transfer sensor without said buffer CCD is called the full frame frame transfer sensor. The CCD area sensor having separately the vertical CCD and the picture cell column is called the interline CCD sensor, (the interline transfer sensor for short). The interline transfer sensor of which the transfer electrode between the picture cell and the vertical CCD is connected to the transfer electrode of the vertical CCD is called the common electrode interline transfer sensor. Said transfer electrode between the picture cell and the vertical CCD is named the address transfer electrode for short. The transfer electrode of the vertical CCD is named the vertical transfer electrode. Generally, a CCD is driven by 1 or 2 or 3 or more-phase voltage. In order to reduce the smear noise being the important problem of the CCD area sensor, Japanese Patent Application No. 56-35067 discloses subtracting one row of the smear noises memorized previously, from one row of the signals generated later.

Japanese patent application Nos. 58/41211, 62547, 76477, 86416, 91967, 207881, 232134, 240644, 249754, 59/15950, 34839, 49684, 69835, 91947, 95314, 101456, 189970 211797 are prior applications op the present invention.

Japanese patent application No. 59-66277 describing the two-electrode/bit sensor of the clocked line type is the prior application relating to the present invention.

SUMMARY OF THE INVENTION

In spite of said prior arts, the imager competing against imaging tubes and optical cameras requires more improvements. The improvement of S/N ratio and, in particular, the improvement of the signal per smear noise ratio is important. The first object of the invention is to improve the S/N ratio of the imagers. The second object of the invention is to improve resolution of imagers.

The 1st embodiment

On the CCD area sensor, the feature of the invention is to apply the dissimilar clock voltages to the clocked vertical transfer electrodes, to inject again the next empty potential well from the output terminal of the vertical CCD before the previous empty potential well injected from said output terminal reaches the opposite end and, to separately transfer all the charge packets in potential wells of the vertical CCD. Said transfer is briefly called the continuous injection electrode/bit transfer. Each charge packet in the vertical CCD is being accumulated in each potential well under the directional transfer electrode or, under the odd (or even) non-directional transfer electrode. Of course, the potential barier is created under the even (or odd) non-directional transfer electrode. The non-directional transfer electrode is the transfer electrode which can create a flat channel potential under itself. And the non-directional transfer electrode can transfer charge packets to either of the directions. The directional transfer electrode is the transfer electrode which can create the potential barier having a shallow potential VL and, the potential well having a deep potential VH, in the channel area. Typically, four-phase CCDs have four kinds of the non-directional transfer electrodes. And the two-phase CCD has two kinds of the directional transfer electrodes. For example, in the CCD with the channel of the N type, the shallow potential is the greater potential toward the negative potential, and the deep potential is the greater potential toward the positive potential. Accordingly, the vertical CCD of the present invention can have half the transfer electrode numbers per one cell, in comparison with a traditional vertical CCD with two or four phase clock voltage. And, the charge transfer ability can be doubled. The fact to apply the dissimilar clock voltage to each transfer electrode of CCD and, the fact to separately transfer the charge packets under directional transfer electrodes or odd (or even) non-directional transfer electrodes are well known. For example, "Sequin and Tompsett, Kindaikagakusya, The Charge Transfer Devices, pp 36-37 and pp 228-229", describes them. However, in said prior art, every charge packet is separately transferred as far as one potential well pitch by transferring, in the opposite direction, one empty potential well from the output terminal of the vertical CCD to the opposite end. Consequently, because the charge transfer speed becomes too slow, the CCD area sensor can not use said prior art. To improve the transfer speed, the art dividing M pieces of transfer electrodes of the vertical CCD to N groups and the art arranging N pieces of the empty potential well in the CCD are proposed. Consequently, the charge transfer speed becomes N times, and the clock voltage requires only M per N-phase. However, in the CCD imager, if the ratio of potential wells per a cell is not an integral number, the transfer electrode structure of the vertical CCD becomes complicated, and the accumulating ability of each potential well becomes small. This problem is solved by this invention. The other features and advantages will be apparent from the following.

The 2nd embodiment

Referring to the 2nd embodiment, each clocked transfer electrode receives the dissimilar clock voltage one another. And, the empty potential well is injected from the output terminal of the vertical CCD. Then, the next empty potential well is injected from said output terminal before the empty potential well injected previously reaches the opposite end. And, one or two or four-phase voltage is applied to the clocked transfer electrodes after the empty potential well had reached the opposite end. When the empty potential well reaches opposite end or reaches the transfer electrode which exists apart as far as one bit pitch, each empty potential well is placed between adjacent two signal potential well. The signal potential well is the potential well accumulating the signal charge packet. Consequently, the traditional one or two or four phase clock voltage can drive the vertical CCD after the empty potential well reached the opposite end.

The 3rd embodiment

In one embodiment, the vertical CCD has clocked directional transfer electrodes, and each charge packet in the potential well under each clocked directional transfer electrode is separately transferred. In one embodiment, one directional transfer electrode per one cell is placed. And, in other embodiment, the vertical CCD of the interline transfer sensor has two directional transfer electrodes per one cell and, transfers the signal charge packet of one cell, by means of adjacent two potential wells. Or the signal charge packet is transferred by the odd (or even) potential well, and the noise charge packet is transferred by the even (or odd) potential well. Namely, the readout of the charge packets of two rows or, the operation of the twice transfer or, the independent transfer of the signal charge packet and the noise charge packet, is possible. In the embodiment of the interline transfer sensor with two directional transfer electrodes per one cell, the odd (or even) potential well transfers the signal charge packet and the adjacent even (or odd) potential well accumulates a non-transferring charge packet. Consequently, the transfer efficiency is improved.

The 4th embodiment

Referring to one embodiment of 3rd embodiment, the medium channel area between adjacent two clocked directional transfer electrodes has a middle constant potential. In particular, it is desirable for the frame transfer sensor. In one embodiment, the non-directional transfer electrode with the middle constant potential is placed upon said medium channel area. Because, said non-directional transfer electrode has a constant voltage, the non-directional transfer electrode can have thin thickness and high blue sensitivity. In the other embodiment, the vertical CCD has a bulk channel. And, by the ion implantation into the surface of the exposed medium channel area, the middle constant potential is created in the bulk channel area under it. Consequently, the exposed medium channel area has the high blue sensitivity.

The 5th embodiment

Referring to one embodiment, the vertical CCD comprises the clocked directional transfer electrodes and comprises the middle constant potential wells and the middle constant potential bariers, created in the medium channel area between the clocked directional transfer electrodes.

The middle constant potential wells and bariers are created by placing the directional transfer electrodes applied the middle constant potential, in the channel area between the clocked directional transfer electrode. Or, they are created by twice of the ion implantation in the exposed surface area of the medium bulk channel area. This embodiment improves the blue sensitivity of the frame transfer sensor.

The 6th embodiment

Referring to one embodiment, the potential wells are created under the odd (or even) clocked non-directional transfer electrodes and the potential bariers are created under the even (or odd) clocked non-directional transfer electrodes. And, the charge packets in the potential wells are separately transferred. In one embodiment, two clocked non-directional transfer electrodes per one cell are placed. Of course, the frame transfer sensor can be operated the interlace by alternating the position of the potential well and the potential barier every field. Consequently, the numbers of the cells in the vertical direction become equivalently double. In one non-directional transfer electrode per one cell and, to operate the interlace by means of transferring the signal charge packets of the dissimilar rows every field. Of course, in the embodiment including two rows per one cell, the parallel readout of two rows is possible. And, the transfer method disclosed in the 3rd embodiment is possible.

The 7th embodiment

Referring to the invention, after the empty potential well injected from the output terminal of the vertical CCD has transferred, in the vertical direction, as far as two-potential wells pitch, the next potential well is injected again from said output terminal.

The 8th embodiment

Referring to the desirable embodiment, each clocked vertical transfer electrode is connected to the output contact point of the shift register which generates the clock voltage for the vertical transfer or, to the output contact point of the buffer circuit being the current amplifier and controlled said output contact point of the shift register. Generally, the buffer circuit is a source-follower circuit or a inverter and, has a small output resistance.

The 9th embodiment

Referring to the continuous injection electrode/bit sensor of which the vertical CCD comprises the clocked non-directional transfer electrodes, (the above sensor is named the two-electrode/bit sensor for short), each clocked non-directional transfer electrode is connected to the output contact point of each inverter of a two-phase shift register or, to the output contact point of each buffer circuit controlled by the output contact point of said each inverter. Consequently, the clock voltages for the vertical transfer of the two-electrode/bit sensor can be created. Of course, each clocked non-directional transfer electrode can be connected to the output contact point of the odd (or even) inverter of a four-phase shift register.

The 10th embodiment

Referring to the continuous injection electrode/bit sensor of which the vertical CCD comprises the clocked directional transfer electrodes, (the above sensor is named the one-electrode/bit sensor for short), each clocked directional transfer electrode is connected to the output contact point of the odd (or even) inverter to a two-phase shift register or, to the output contact point of each buffer circuit controlled by the output contact point of said odd (or even) inverter. Consequently, the clock voltages for the vertical transfer of the one-electrode/bit sensor can be created. Of course, each clocked directional transfer electrode can be connected, directly or via the buffer circuit, to the output contact point of one of three kinds of inverters of a three-phase inverter.

Namely, the meaning of the 10th embodiment, is that each clocked directional transfer electrode is connected to one output contact point of one transfer stage of the shift register. Of course, the meaning of each clocked directional transfer electrode is the clocked directional transfer electrode of each row.

In the 9th embodiment, the clocked non-directional transfer electrode is connected to the output contact point of half the one transfer stage of the shift register.

In the 8th embodiment, the two-phase shift register has simple structure, simple operation and high density of cells in the vertical direction. In this dependent invention, the inverter connected to the clocked directional transfer electrode, (Said inverter is named the output inverter for short.) or, the inverter of the buffer circuit is desirable to be operated by the ratioless action. The ratioless inverter has the charging period when output contact points are simultaneously charged, before the evaluation period when said outout contact points are discharged. Consequently, the clocked directional transfer electrode upon the empty potential well of the vertical CCD changes said empty potential well from the shallow potential to the deep potential, before the charge packet is transferred into said empty potential well. Consequently, the one-electrode/bit transfer is stabilized.

The 11st embodiment

Referring to the one-electrode/bit sensor or the two-electrode/bit sensor, odd (or even) clocked transfer electrodes and even (or odd) clocked transfer electrodes are respectively driven by the dissimilar shift register, directly or via the buffer circuit. In the preferred embodiment, one output contact point per one transfer stage of each shift register is connected to a clocked transfer electrode. Consequently, it is possible to generate the clock voltage for the one-electrode/bit sensor or two-electrode/bit sensor. Further, each shift register with less transfer stage can be placed at both sides of the imaging are, and the vertical distance of one transfer stage of each shift register is doubled. And, the clock frequency of each shift register becomes low.

The 12th embodiment

Referring to the common electrode interline transfer sensor, by charging the power source voltage of the shift register to the deepest readout voltage VR, the signal charge packets in all the cells or the odd (or even) cells can be transferred to the vertical CCD. Consequently, it is necessary to add the circuit generating the readout voltages and, to protect the interference between the shift register and the added circuit.

The 13rd embodiment

Referring to the one-electrode/bit sensor of which the vertical CCD comprises the clocked directional transfer electrodes, each clocked directional transfer electrode is connected to the one or two-phase clocking power source via a sequential switch. Said sequential switches are operated in order,. And, said sequential switches operate previously the clocked directional transfer electrode placed near to the output terminal of the vertical CCD, and the sequential switches operate later the clocked directional transfer electrode placed far, to the output terminal of the vertical CCD. Said electrode/bit sensor is named the one-electrode/bit sensor of the clocked line type. And, the electrode/bit sensor of the 8th embodiment is named the electrode/bit sensor of the shift register type.

The 14th embodiment

Referring to one embodiment of the 13rd embodiment, adjacent clocked directional transfer electrodes are separately connected to the first and second power sources. And. the adjacent two sequential switches operate at a time. Consequently, the transfer stage numbers of the shift register driving the sequential switches can be half. And, the action of the sequential switches can be simple.

The 15th embodiment

Referring to the electrode/bit sensor of the clocked line type, of which the clocked vertical transfer electrode is connected to the clocked line via the sequential switch, each clocked vertical transfer electrode is applied the necessary voltage before the vertical transfer. Then, each clocked vertical transfer electrode is cut off from the clocked line, and is connected, in order, to the clocked line via the sequential switch. Consequently, the potential control of the clocked vertical transfer electrodes, (the clocked vertical transfer electrodes conclude the clocked directional transfer electrodes and the clocked non-directional transfer electrodes), becomes very simple. The continuous injection electrode/bit sensor of which the clocked directional transfer electrode is connected to the clocked line via the sequential switch is named the one-electrode/bit sensor of the clocked line type. In the one-electrode/bit sensor of the clocked line type, all the clocked directional transfer electrodes have the deep potential before the vertical transfer. And, the continuous injection electrode/bit sensor of which the clocked non-directional transfer electrode is connected to the clocked line via a sequential switch is called the two-electrode/bit sensor of the clocked line type. In the two-electrode/bit sensor of the clocked line type, before the vertical transfer, the odd (or even) clocked non-directional transfer electrodes have the deep potential, and the even (or odd) clocked non-directional transfer electrodes have the shallow potential. However, the two-electrode/bit sensor of the clocked line type has complicated wave forms. The electrode/bit sensor of the clocked line type can have the bigger output resistance of the shift register than the output resistance of the electrode/bit sensor of the shift register type disclosed in the 8th embodiment.

However, the sequential switch needs to have smaller channel resistance. In one embodiment, before the vertical transfer, the initial potentials are applied to the clocked vertical transfer electrodes by means of connecting each clocked vertical transfer electrode to a resetting line via a reset switch. In the common electrode interline transfer sensor, it is possible to apply the readout voltage VR to necessary vertical transfer electrodes by means of circuit resetting said clocked vertical transfer electrodes.

The 16th embodiment

Referring to the desirable embodiment of the 15th embodiment, before the vertical transfer, the initial potentials of the clocked vertical transfer electrodes are applied by the clocked line connected to each clocked vertical transfer electrode via the sequential switch. Naturally, when said initial potentials are applied, all the necessary sequential switches are turning on, by the shift register. In the common electrode interline transfer sensor, the art instituting the initial potentials can be also employed to transfer the signal charge packet from a cell to the vertical CCD by means of applying the readout voltage VR to the necessary clocked vertical transfer electrodes. Namely, the readout voltage VR is applied to the necessary clocked line by means of turning on the necessary sequential switches. In this invention, because each clocked vertical transfer electrode is connected to the clocked line via the sequential switch controlled by the shift register. Consequently, the circuit structure and the vertical transfer operation become easy.

The 17th embodiment

Referring to the preferred embodiment of the one-electrode/bit sensor of the invention, the shift register applying the clock voltages to the vertical transfer electrodes, directly or via the buffer circuit, is placed on both sides of the imaging area. Also, the shift register turning on, in order, the sequential switch is placed on both sides of the imaging area. In one embodiment, the odd (or even) clocked vertical transfer electrodes are connected, directly or indirectly, to the shift register placed on the left side of it or, are connected to the clocked line via the sequential switches controlled by said shift register. Similarly, the shift register placed on the right side of it controls the even (or odd) clocked vertical transfer electrodes. Consequently, the design of the shift register becomes easy.

The 18th embodiment

Referring to one embodiment of the 17th embodiment, one vertical scanning line which drives one row of the clocked vertical transfer electrodes is driven from both sides of it. Of course, said one vertical scanning line can be divided. Consequently, the sequential switch or the shift register or the buffer circuit can be small.

The 19th embodiment

Referring to one embodiment of TV camera employing the electrode/bit sensor, it is possible to transfer signal charge packets from all the cells during one field and, to indicate the image of the signal charge packets of odd (or even) cells. Consequently, the remainning field image can be eliminated, and the dynamic range can be improved. Of course, all the signal charge packets generated at the low lighting condition can be indicated.

The 20th embodiment

Referring to one embodiment of TV camera employing the interline transfer sensor of the electrode/bit transfer type, it is possible to operate the frame accumulation action at the low lighting condition and to operate the field accumulation action at the high lighting condition. For example, the change of the accumulation actions are operated by applying the readout voltage VR to all or half the clocked vertical transfer electrodes, before the vertical transfer starts.

The 21st embodiment

Referring to one embodiment of the interline transfer sensor of the electrode/bit transfer type, the vertical CCD can have one potential well per one cell, can alternatively accumulate the noise charge packets and, the signal charge packets of odd (or even) row and, can separately transfer said noise charge packets and signal charge packets. Consequently, the S/N ratio and, in particular, signal per the dark current noise and the smear noise, are improved.

The 22nd embodiment

Referring to the 21st embodiment, after the vertical transfer of the signal charge packets, the residual noise charge packets in the vertical CCD is cleared out or, is arranged again. Consequently, the smear noise charge packet in the signal potential well becomes approximately equivalent to the smear noise charge packet in the adjacent noise potential well. Accordingly, the smear noise is eliminated by detecting the difference of voltages generated from said two potential wells. Said clearing action can be operated by driving the vertical CCD at a high speed during the vertical blanking period or by transferring the residual noise charge packets into the drain area which is adjacent to the vertical CCD. Namely, in the continuous injection electrode/bit sensor of the plesent invention, the potential wells become half at the end of the vertical transfer. Consequently, the residual noise charge packets exist in the only odd (or even) potential wells, when the next vertical transfer starts. Consequently, by eliminating or arranging of residual charge packets and by subtracting the output signals from adjacent two potential wells, the smear noise and residual noise charge packet are eliminated.

The 23rd embodiment

Referring to the continuous injection electrode/bit sensor of which the vertical CCD has two potential wells per one cell, the embodiment that adjacent two potential wells transfer, in the vertical direction, the signal charge packets of one cell or, the embodiment that the potential well keeping a residual noise charge packet transfers, in the vertical direction, the signal charge packet of one cell, has the approximately constant smear noise charge packet mixing into the signal charge packet. Consequently, the smear noise is eliminated by memorizing the smear noise charge packets during the vertical blanking period and by subtracting said smear noise charge packets from signal charge packets.

The features and advantages of each embodiment are described as follows.

In the following description, the two-phase shift register comprising inverters is employed. Of course, the use of the three or four-phase shift register comprising inverters or, a BBD or CCD shift register can be employed.

As for the invention, FIG. 4, FIG. 5 and FIG. 6 show that the one-electrode/bit sensor of the shift register type can employ dynamic shift registers. This fact is important. Namely, by the charging action of said dynamic shift register, the directional transfer electrodes are charged at the deep potential, and the operation becomes easy. And, the dynamic shift register eliminates the power consumption and makes the production easy. Accordingly, the inventor can claim the one-electrode/bit sensor of the dynamic shift register type.

In the preferred embodiment of the invention, the electrode/bit sensor is desirable for a color TV camera of a chip or a magnetic camera, reading out separately adjacent two rows during one horizontal period. This fact is important. Because the prior TV camera on one chip has a small number of cells in the horizontal direction, the resolution of the luminance and the color is not good. Or, the prior magnetic camera has a bad resolution against a moving object, because of creating one frame image with the pictures read out during two field. In the invention, because adjacent two rows are separately read out during one horizontal scanning period, the problem is solved. So far, to solve said problem, a number of the transfer stages of the vertical CCD or a number of the vertical CCDs is doubled. These prior art gives the disadvantage for the structure or the production process or the S/N ratio.

Accordingly, the inventor can claim the CCD imager which separately reads out of adjacent two rows during one horizontal period.

Further, the explanation on the invention is added as follows.

The prior electrode/bit transfer method is substantially a symmetrical N-phase clock transfer method. And, as the increase of N makes the transfer speed slow, the CCD imager which needs to read out greater than one row during a horizontal blanking peiod can not employ it for the vertical CCD. the continuous injection electrode/bit transfer method of the invention is same as the prior electrode/bit transfer method at the point of employing many-phase clock voltage. However, the feature of the invention is to employ the non-symmetrical clock voltage till half the rows of CCD is read out and, to employ the equivalent one or two or four-phase clock voltage later. Consequently, the signal charge packets which have been accumulating in the CCD before the transfer, are transfer in order. Accordingly, the continuous injection electrode/bit transfer method can applied to a CCD line sensor or the output CCD of the CCD structure of the SPS type. Further, it is unknown that said continuous injection electrode/bit transfer can be used for the vertical transfer of the CCD area sensor. And, the practical operation or the preferred or necessary circuit constitution or the application, of the continuous injection electrode/bit transfer method is unknown.

As for the CCD area sensor, the inventor found to inject one or two-empty potential well during a horizontal period and, to transfer, in the vertical direction, the injected empty potential well so far as a short distance during a horizontal period.

As the vertical CCD of the invention has a double number of the resolution in the vertical direction, in comparison with the prior vertical CCD having a same number of vertical transfer electrodes.

In this specification, the directional transfer electrode is the vertical transfer electrode having the potential barier and the potential well under itself. And, the non-directional transfer electrode is the vertical transfer electrode having either of the potential well or the potential barier under itself. The continuous injection electrode/bit transfer with the directional transfer electrodes is named the one-electrode/bit transfer, and the continuous injection electrode/bit transfer with the non-directional transfer electrode is named the two-electrode/bit transfer. And, the shallow potential is the potential accumulating no charge packet, and the deep potential is the potential accumulating a charge packet. Namely, in a CCD channel of N type, the shallow potential is higher toward the negative direction, and the deep potential is higher toward the positive direction. The plesent invention can be applied to the vertical CCD of the interline transfer sensor, the full frame frame transfer sensor and the normal buffer frame transfer sensor can be driven by the shift register driving the vertical CCD. In this embodiment, by resetting the only vertical transfer electrodes of the vertical CCD before the transfer, the vertical CCD can operate the continuous injection electrode/bit transfer, and the buffer CCD can operate the two or four-phase clock transfer. The frame transfer sensor of two-electrode/bit transfer type can operate the interlace by alternating the initial positions of the potential bariers and potential wells.

BRIEF DESCRIPTION OF THE DRAWINGS

FIG. 3 (from A to F) is the vertical transfer diagram showing the one-electrode/bit sensor of one-shift register type. It shows that the signal charge packets Q (from 2 to 6) accumulating in the potential wells 3 (from U to V) are transferred by injection of the pulse informatiomns VL and VH from the input terminal 2C of the shift register 2A.

FIG. 4 (from A to F) is the vertical transfer diagram of the one-electrode/bit sensor of the two-shift transfer register type. It shows that the scharge packets Q (from 2 to 6) in the potential wells 3 (from U to Y) are transferred by the alternate injection of the pulse informations from the input terminal of the shift registers 2A and 2B.

FIG. 11 (from A to C) is the arrangement diagram of the residual noise charge packets keeping in the it sensor of the one-electrode/bit type. It shows that the residual noise charge packets are eliminated by subtracting of charge packets keeping in the adjacent two potential wells.

FIG. 11 (from D to F) is the arrangement diagram of the residual noise charge packets keeping in the interline transfer sensor of the two-electrode/bit type. It shows that the residual noise charge packets are eliminated by subtracting of the charge packets keeping in the adjacent two potential wells.

FIG. 21 is one driving circuit diagram of the one-electrode/bit sensor of the one-clocked line type, shown in FIG. 17 and FIG. 19.

FIG. 22 is the wave form chart of the clock voltage V1 shown in FIG. 21.

FIG. 23 (from A to L) is the vertical transfer diagram of the vertical CCD 6 driven by the driving circuit shown in FIG. 21. It shows that the signal charge packets Q (from 1 to 8) in the potential wells 3 (from Z to T) are transferred in order.

FIG. 24 is the clock voltage diagram showing the other operation of the shift register of FIG. 5.

THE DESCRITPTION OF THE PREFERRED EMBODIMENTS

Figure 1:
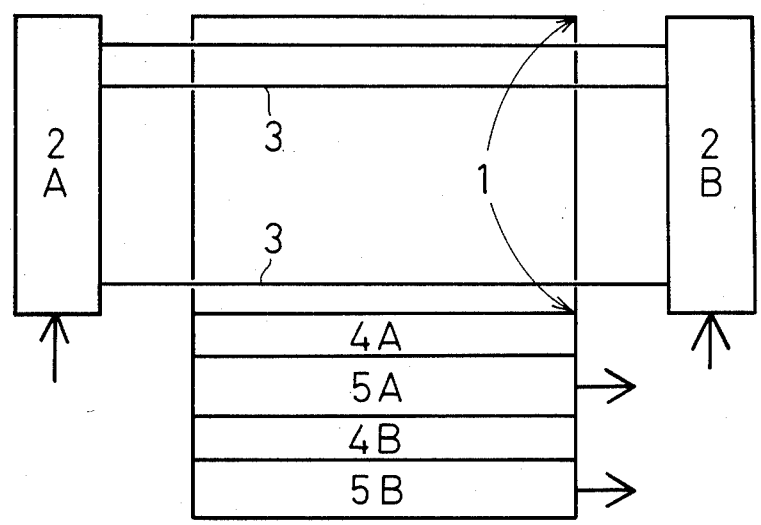
FIG. 1 is one block diagram showing the continuous injection electrode/bit sensor of one-shift register type of the invention. It shows that the vertical scanning lines 3 are driven by the shift registers 2a and 2b, which are placed on both sides of the imaging area.
Figure 2:
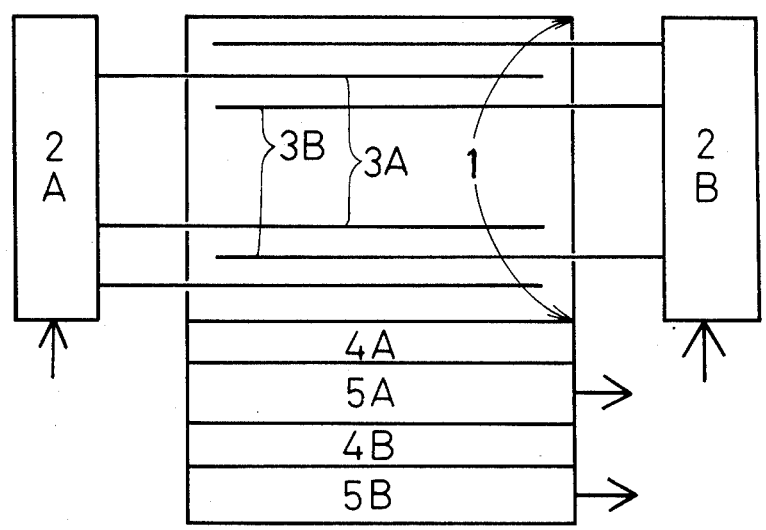
FIG. 2 is the other block diagram showing the continuous injection electrode/bit sensor of two-shift register type. It shows that the odd (or even) rows of the vertical scanning lines 3a and, the even (or odd) rows 3b are separately driven by the dissimilar shift registers 2A and 2B.

FIG. 1 and FIG. 2 are block circuit diagrams showing one embodiment of the electrode/bit sensor of the continous injection type disclosed by the independent invention 1.

In FIG. 1, the vertical scanning lines 3 placed, in the horizontal direction, on the imaging area are driven by shift registers 2A and 2B generating the clock voltages for the vertical transfer. It is natural that buffer inverters for the current amplification can be placed between the shift transfer register and the vertical scanning lines.

In the following description, the embodiment employing the vertical scanning line driven by the shift register are described. Because the vertical scanning line is one body of the vertical transfer electrode generally, they are given same symbols.

In FIG. 1, because each vertical scanning line is driven by the shift register 2A and 2B, the charging and discharging become quick. 2A and 2B have the same actions. It is possible to divide 3 into halves. The horizontal CCD 5A is connected to the vertical CCD or the buffer CCD by the transfer electrode 4A. The horizontal CCD 5B is connected to the horizontal CCD 5A by the transfer electrode 4B.

In FIG. 2, the odd (or even) vertical scanning lines 3A are respectively connected to the output contact points of the shift register 2A. The even (or odd) vertical scanning lines 3B are respectively connected to the output contact points of the shift register 2B.

In FIG. 1 and FIG. 2, the cell, the buffer CCD and the vertical CCD were omitted. FIG. 3 (from A to F) shows the one-electrode/bit transfer method having the structure of FIG. 1. However, 2B, 4B and 5B were omitted.

The vertical CCD 6 has the directional transfer electrode 3 (from U to Z). The transfer electrode 4A is placed between 3Z and 5A. It is possible to place the buffer CCD between 3Z and 4A. Before the transfer starts, 3 (from U to Z) are charged to the deep potential VH, and the signal charge packets Q (from 1 to 6) are accumulated in potential wells under them.

Of course, the signal charge packets of a interline transfer sensor are injected from a cell column, and the signal charge packets of the frame transfer sensor are injected by the lighting.

In FIG. 3A, 3Z becomes the shallow potential, and Q1 under 3Z is transferred to the horizontal CCD 5A via 4A. The clocked operations of 4A and 5A are well known, and their detail explanation is omitted.

In FIG. 3B, 3Z becomes the deep potential, and 3Y becomes the shallow potential, and 3Y and 4A become the deep potential. Q2 is transferred into the horizontal CCD 5A, and Q3 is transferred under the 3Y. Similarly, the signal charge packets Q (from 3 to 6) are separately transferred in the vertical direction by the operation shown in FIG. 3 (from D to F). The vertical scanning lines, (the VSLs), 3 (from A to Z) are respectively connected to the output contact points of the shift register 2A.

In FIG. 3 (from A to C), by injection alternatively the shallow potential and deep potential, which are pulse informations from the input terminal 2C of the shift register 2A, said vertical transfer, (the transfer in the vertical direction), canbe operated. In one embodiment reading out one row during one horizontal period, the transfer from FIG. 3A to FIG. 3B or, the transfer from FIG. 3B to FIG. 3C is operated. And, the horizontal CCD 5A transfers, in the horizontal direction, signal charge packets during the horizontal scanning period.

In FIG. 3 (from A to F), after the empty potential well shown as the symbol X has transferred, in the opposite direction, as far as a two-potential well pitch, the next empty potential well is injected. The PW is the abbreviation of the potential well. In the one-electrode/bit transfer of FIG. 3 (from A to F), it is desirable that the empty potential well has changed from the shallow potential to the deep potential. The good method charging again the directional transfer electrode from the shallow potential to the deep potential, is to apply the deep potential to all the directional transfer electrodes, before the shallow potential is applied to the adjacent directional transfer electrode. If the output inverter of the shift register 2A is a ratioless inverter having the charging period and the discharging period, said operation becomes easy.

In FIG. 4 (from A to F), the one-electrode/bit transfer method with the structure of FIG. 2A is explained. FIG. 4 (from A to F) has same actions as FIG. 3 (from A to F). However, in FIG. 4 (from A to F), the shift registers 2A and 2B alternatively generates the deep potential. The actions of 2A and 2B can be operated briefly, if the output inverters of the shift registers are the dynamic type and, in particular, the ratioless type. In the preferred embodiment, it is desirable that the charging action of either of the shift registers starts earlier than the discharging action of the other shift register.

In the embodiment employing the buffer inverter of the dynamic type and, in particular, the ratioless type, the clock actions of FIG. 3 (from A to F) and FIG. 4 (from A to F) are possible, too. The charging action of the inverter is the clock action applying the deep potential to the output contact point of itself, and the discharging action of the inverter is the clock action applying the shallow potential to the output contact point of itself. It is apparent that the one-electrode/bit transfer of the plesent invention can be operated by simple clocked actions.

In FIG. 3 (from A to F) and FIG. 4 (from A to F), if the deep potential is injected again to each directional transfer electrode after the transfer of the signal charge packets, the next actions of the one-electrode/bit electrode/bit transfer can be operated.

Figure 5:
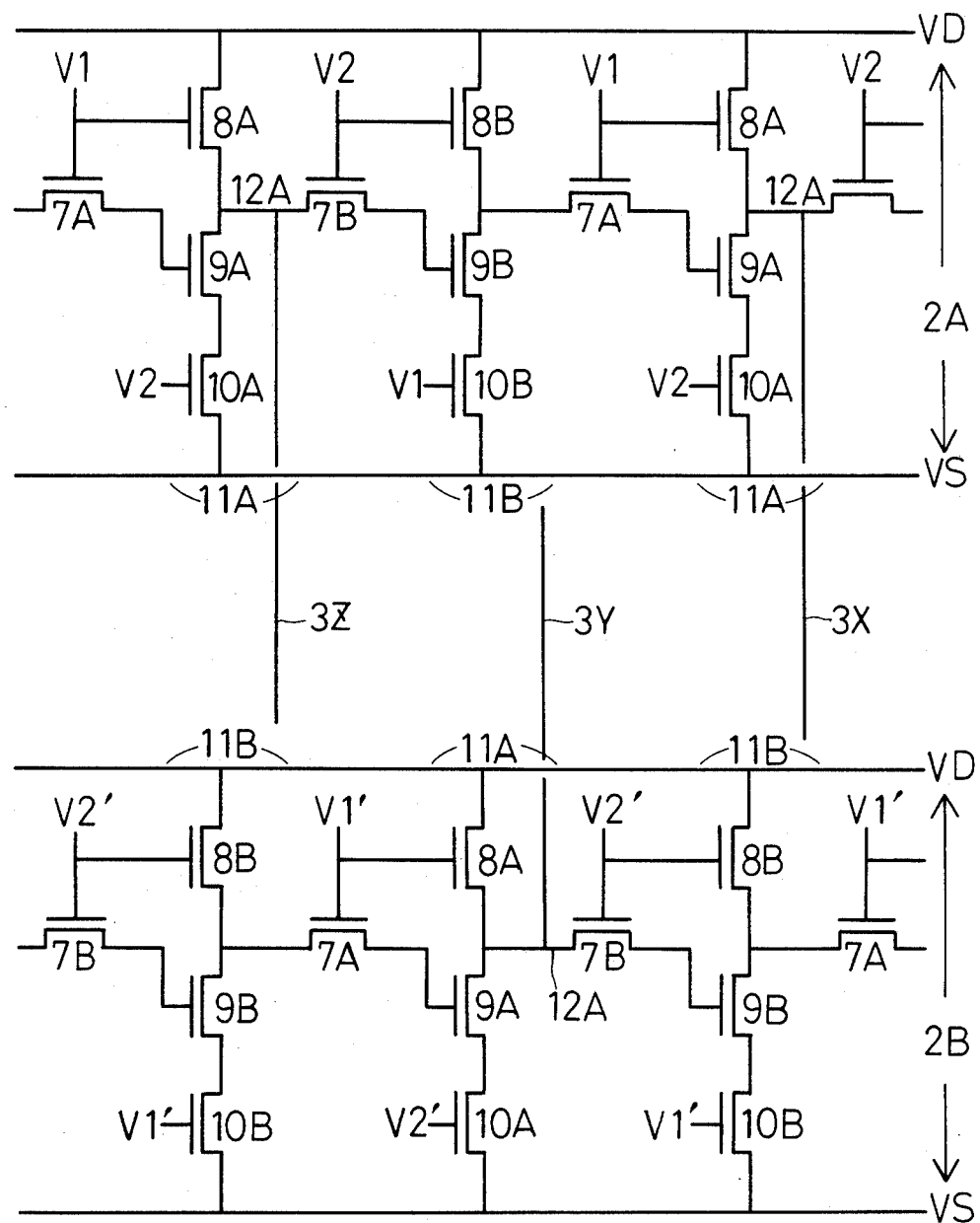
FIG. 5 is one equivalent circuit diagram of the shift registers 2A and 2B which are illustrated in FIG. 4. It shows that the output inverter 11A of the shift register is a ratioless inverter.

FIG. 5 is one equivalent circuit diagram of the shift register shown in FIG. 4. Of course, the shift register of the FIG. 3 can employ the same structure of the shift register shown in FIG. 5. The vertical scanning lines 3Z, 3Y, and 3X are respectively and directly connected to the output contact points 12A and 12A' of shift registers 2A and 2B. Of course, it is possible to connect both with switch. 11A is the dynamic inverter having the charging switch 8A, the evaluating switch 9A and the discharging switch 10A. The connecting inverter 11B which connects two output inverters has the discharging switch 10B, the evaluating switch 9B and the charging switch 8B. 11A and 11B are alternatively connected by either of the connecting switches 7A and 7B.

Figure 6:
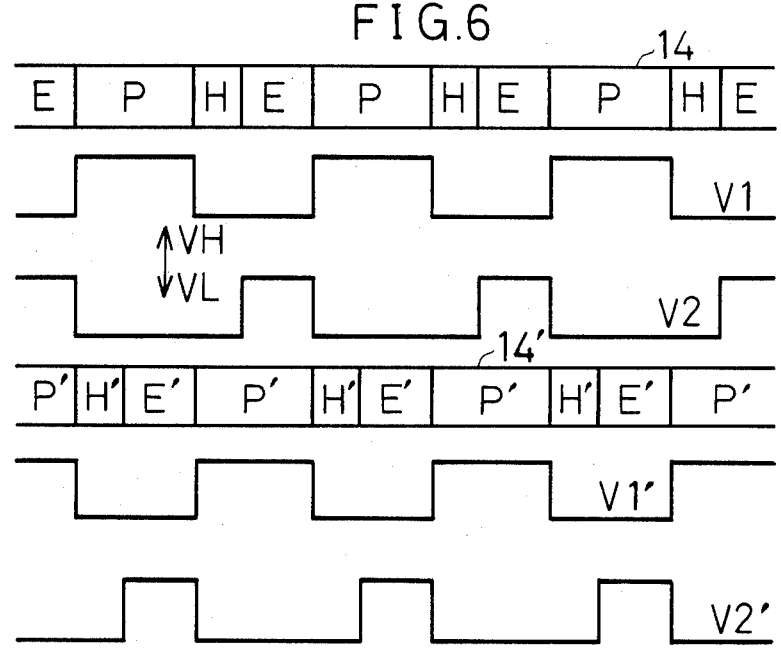
FIG. 6 is the clock voltage diagram of the shift registers 2A and 2B, which are illustrated in FIG. 5.

FIG. 6 is one operation diagram of the two-phase shift registers 2A, and 14' is the operation diagram of 2B. The clock voltages v1' and V2' are applied to 2B, and the clock voltages V1 and V2 are applied to 2A. P of 14 is the charging state of the outputcontact point 12A. H is it's holding state. And, E is it's evaluating state. Similarly, P' of 14' is the charging state of the output contact point 12' of 2B. H' is it's holding state. And, E' is it's evaluating state. As the operation of a MOS two-phase shift register is well known, the detail description is omitted.

In FIG. 6, E starts later than P'. And E' starts later than P. In FIG. 6, by placing P, H and E during one horizontal blanking period, the signal charge packets of one row can be transferred into the horizontal CCD. In FIG. 5, by turning off 10A and by turning on 8A, each directional transfer electrode can be applied the deep potential. At this time, by changing the voltage of the power source VD to the deepest voltage VR, the address transfer electrode of the common electrode interline transfer sensor can be applied the readout voltage VR, and the signal charge packets in the cells are transferred into the vertical CCD. The address transfer electrode is the gate electrode of the switch connecting the cell capacity to the vertical CCD.

Figure 7:
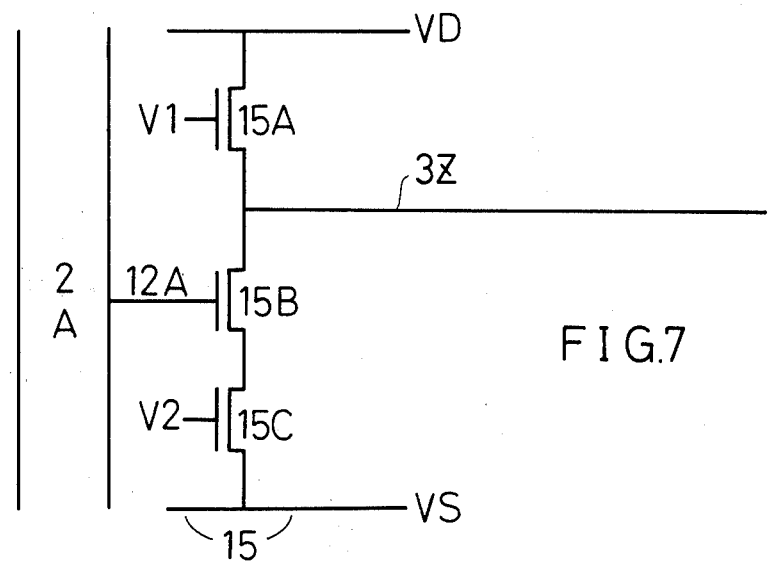
FIG. 7 and FIG. 8 are equivalent circuit diagrams showing the buffer circuit of the continuous injection electrode/bit sensor of the shift register type.

FIG. 7 shows the embodiment connecting the vertical scanning line 3Z to the output contact point of the buffer inverter 15 driven by the shift register 2A. By the dynamic inverter 15, the clock of FIG. 3 (from A to F) and FIG. 4 (from A to F) can be generated. For example, in FIG. 6, the charging switch 15A turns on and the discharging switch 15C turns off, during P period. 15A to 15C turns off during H period. 15A turns off and 15C turns on, during E period.

Figure 8:
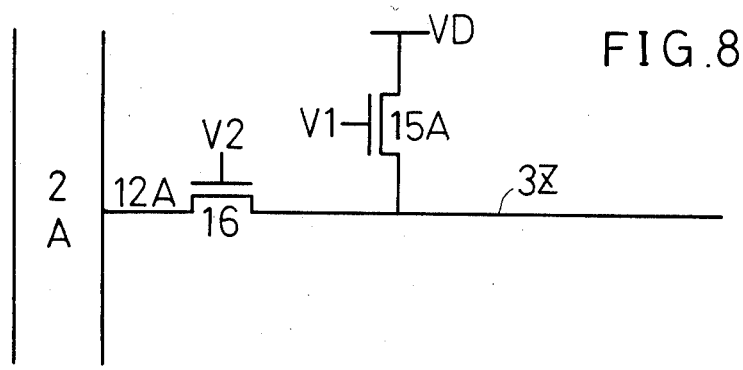

FIG. 8 is one embodiment of FIG. 7. The connecting switch 16 has the same actions as the discharging switch 15c of FIG. 7.

Figure 9:
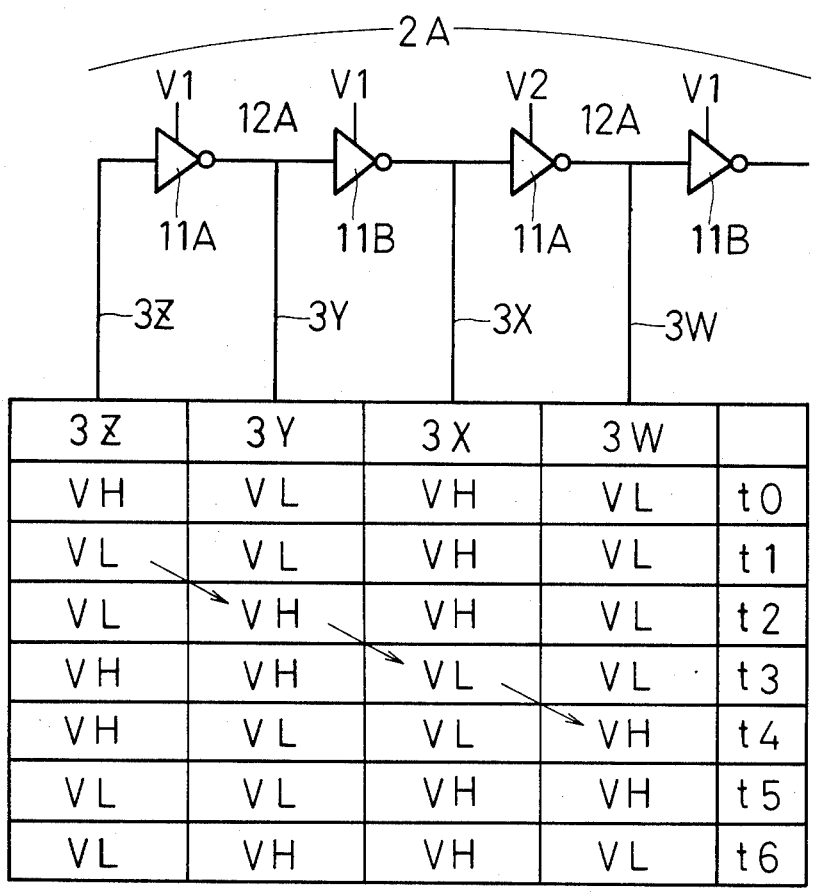
FIG. 9 is one equivalent circuit diagram of the two-electrode/bit sensor of one-shift register type, and it shows the potential variation of the vertical scanning lines 3 (from Z to W) connected to the output contact points of 12A and 12B, of the output inverters 11A and 11B, of the shift register 2A and 2B.

FIG. 9 is the operation diagram explaining (10) and showing the shift register 2A of the two-electrode/bit sensor having the structure of FIG. 1. The shift register 2A comprises the output inverters 11A and 11B, which are alternatively connected each other. And, the vertical scanning lines 3 (from z to W) are connected to the output contact points 12A and 12b, of output inverters. During the period from to to t6, each output contact point of the two-phase shift register 2A changes as shown in FIG. 9, and each signal charge packet under the odd (or even) non-directional transfer electrode can independently transferred in the vertical direction. The potential change of the vertical scanning lines of FIG. 9 are same as FIG. 10 (from A to H). Before operating the vertical transfer, it is natural that each odd (or even) non-directional transfer electrode is applied the deep potential and each even (or odd) non-directional transfer electrode is applied the shallow potential. The above actions can be simply operated, if 11A and 11B employ the dynamic inverters. of course, it is possible to add the special charging switches.

3Z is the vertical scanning line which is nearer to the output terminal of the vertical CCD. 3W is the non-directional transfer electrode which is nearer to the opposite end of the vertical CCD.

Figures 10A, 10B, 10C, 10D:
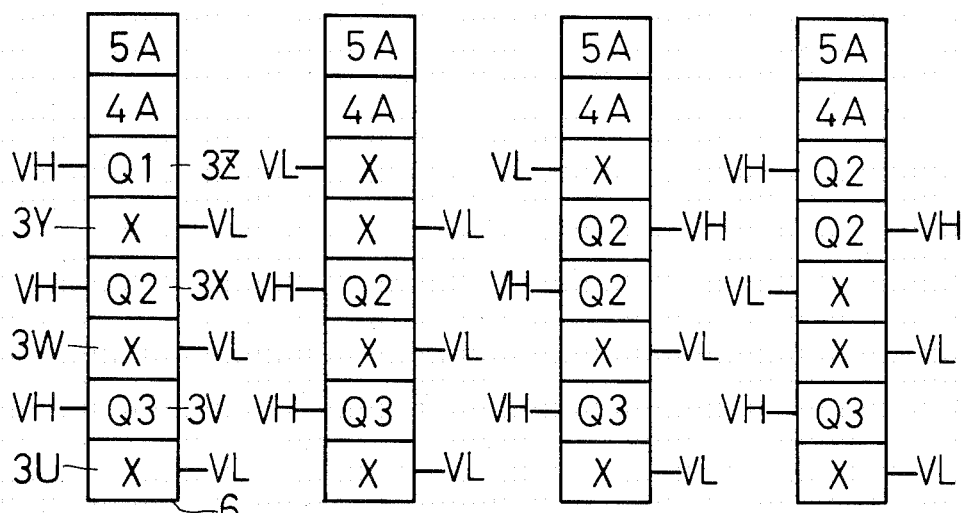
FIG. 10 (from A to H) is the vertical transfer diagram of the two-electrode/bit sensor of the two-shift register type. It shows that the charge packets Q1, Q2, and Q3, which are accumulated in the potential wells 3Z, 3X and 3V, are transferred by the change of clock voltages applied to the non-directional transfer electrodes placed upon the potential wells and the potential bariers 3 (from U to Z). Essentially, the operation of the vertical transfer shown in FIG. 9 is same as the operation of the vertical transfer shown in FIG. 10 (from A to H).
Figures 10E, 10F, 10G, 10H:
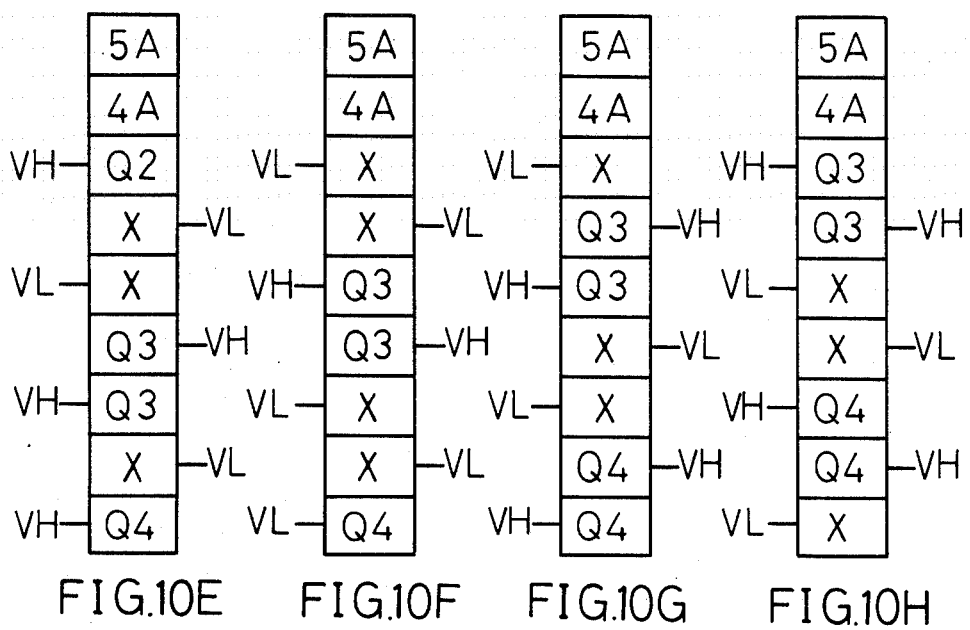

FIG. 10 (from A to H) is the operation diagram showing the two-electrode/bit sensor having the structure of FIG. 2.

However, the description of the shift registers 2A and 2B was omitted.

2A drives the non-directional transfer electrodes 3 (Z, X and V).

2B drives the non-directional transfer electrodes 3 (Y, W and U). By alternative clock operations of 2A and 2B, signal charge packets Q1, Q2 and Q3 can be independently transferred.

In FIG. 9 and FIG. 10, the shift register comprising 11A and 11B can employ the two-phase shift register.

Of course, it is possible to employ four-phase shift register. As for the shift register 2A of FIG. 9, because inverters 11A and 11B alternatively operate the evaluating, (dicharging), action E and the holding action H, the shift register 2A can employ the two-phase dynamic type and, in particular, the ratio type.

In FIG. 10A (from A to H), because the shift register 2A driving the odd (or even) non-directional transfer electrodes and, the shift register 2B driving the even (or odd) non-directional transfer electrodes alternatively operate the holding action H and the evaluating action E, they can employ the dynamic type and, in particular, the ratio type.

In FIG. 9 and FIG. 10 (from A to H), 2A and 2B can employ shift registers having ratioless output inverters. However, because the voltage change of the output contact points during the charging action period must not be applied to the vertical scanning lines, the switches connecting the vertical scanning lines to shift register turn off during the charging period.

FIG. 11 (from A to C) is the operation diagram showing residual charge packets QNRs in the interline transfer sensor of the one-electrode/bit type. At the initial time of the vertical blanking period, the potential wells 3 (from Z' to S') have the state of FIG. 11A. Namely, the residual charge packets QNR (from 1 to 4) are respectively accumulated in the potential wells 3Z', 3X', 3V' and 3T'. Then, the residual charge packets QNR2 and QNR4 are transferred in the vertical direction as far as one potential well pitch. This vertical transfer is operated by applying the shallow potential to potential wells 3X' and 3T'.

For example, in FIG. 5, these clock operations can be created by changing the voltages of the power source VD1 and VD2, and these changes of the voltages are created by connecting the adjacent two charging switches 8A to the dissimilar power sources VD1 and VD2, by cutting off the discharging switch 10A and by turning on 8A.

Of course, in the embodiment with the buffer inverters, the actions can be created by the charging switch. Consequently, the residual charge packets have the arrangement of FIG. 11B. Then, all the directional transfer electrodes are applied the deep potential, and the signal charge packets Q1, Q2, Q3 and Q4 are transferred from cells to the odd (or even) potential wells 3Z', 3X', 3V' and 3T'.

FIG. 11C shows said state. And, charge packets in potential wells 3Z' and 3Y' are read out by the adjacent two horizontal CCDs, and two output voltages read out are subtracted.

Consequently, the smear noise is eliminated by means of the use of their vertical correlation. It is natural to operate the interlace by changing the signal charge packets read out every field.

FIG. 11 (from D to F) is the operation diagram showing that the smear noise-subtracting method can be applied to the two-electrode/bit sensor.

FIG. 11D shows the arrangement of the residual charge packets at the initial time of the vertical blanking period.

FIG. 11E shows that the odd (or even) residual charge packets have been transferred as far as one-potential well pitch.

FIG. 11F shows that the signal charge packets Q1, Q2 and Q3 have been transferred from cells into potential wells 3Z', 3V' and 3R' of the vertical CCD 6. Said fundamental operation is same as the operation of said interline transfer sensor of the one-electrode/bit type.

In stead of arranging the residual charge packets as shown in FIG. 11 (from A to F), it is possible to eject the residual charge packets from the vertical CCD 6 during the vertical blanking period and to subtract charge packets in adjacent two potential wells.

Figures 12, 13:
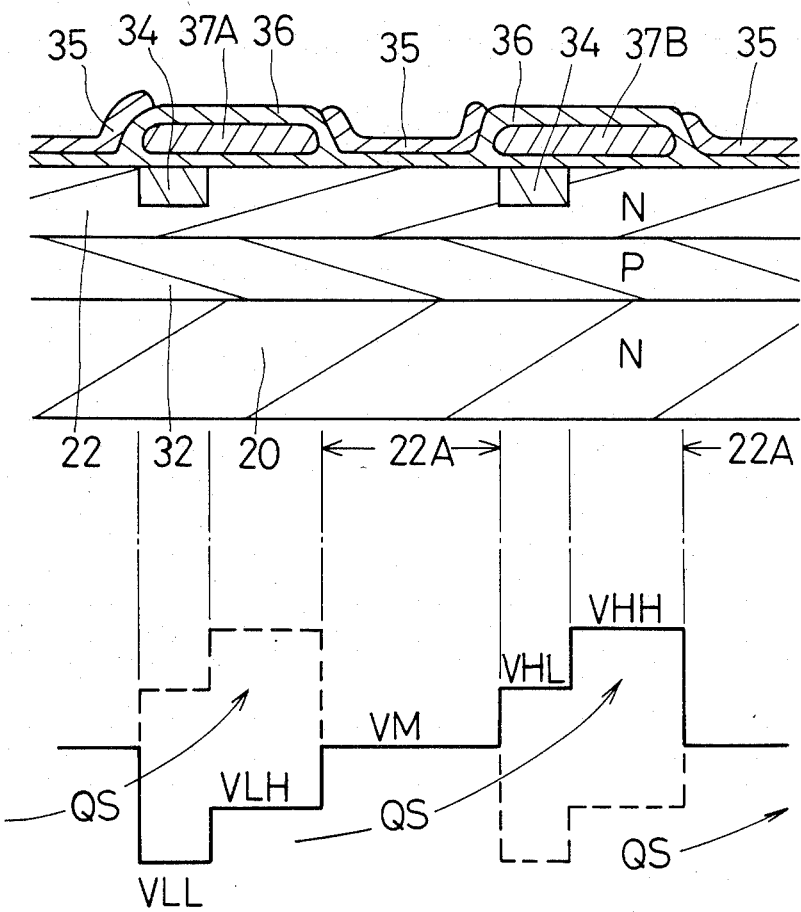
FIG. 12 is one cross-sectional view of the one-electrode/bit sensor which comprises the non-directional transfer electrode 35 applied the middle potential VM, between the clocked vertical transfer electrodes. And, it shows that the vertical CCD is operated by said one-electrode/bit transfer method of the shift register type or the clocked line type.
FIG. 13 is the channel potential diagram of the vertical CCD shown in FIG. 12.

FIG. 12 is one cross-sectional view showing that the one-electrode/bit sensor of the middle potential type, shown in FIG. 5.

The well area of P type 32, (2 exp 15 atoms/cc), is made in surface area of the base of N type 20, (4 exp 14 atoms/cc). The bulk channel area of N type 22, (1 exp 16 atoms/cc), is made on it. The potential barier area 34 is created in a part of the surface of the area 22, by the implantation of Boron.

Directional transfer elevctrodes 37A and 37B are created on the insulated membrane 36 placed on the surface of the area 22. The non-directional transfer electrode 35 with a constant potential is created upon the medium channel area 22A placed between adjacent directional transfer electrode 37A and 37B.

FIG. 13 is the potential diagram of the channel shown in FIG. 12. The medium channel area 22A has a middle potential VM. Because the non-clocked non-directional transfer electrode 35 can be made very thin.

The frame transfer sensor of the one-electrode/bit transfer type is improved the blue sensitivity. In one embodiment of FIG. 12, if the potential barier area is created by implanting Boron ions into the surface of the medium channel area 22A, the non-directional transfer electrode 35 can be omitted.

Consequently, the blue sensitivity is improved further. The ion implantation, into the potential barier area placed under the directional transfer electrode are operated by the same process.

In the above description, they become apparent that the electrode/bit sensor of shift register type can be applied to the vertical transfer of frame transfer sensor and interline transfer sensor, and that the non-interlaced readout or, the interlaced readout of two rows are possible. Further, the change of the interlace and the non-interlace and, the change of the frame accumulation and the field accumulation are possible. It is possible to operate the interlace of two-row readout type when the smear noise is small, and it is possible to employ the smear noise-eliminating method disclosed in (23) and (24) when the smear noise is large.

Figure 14:
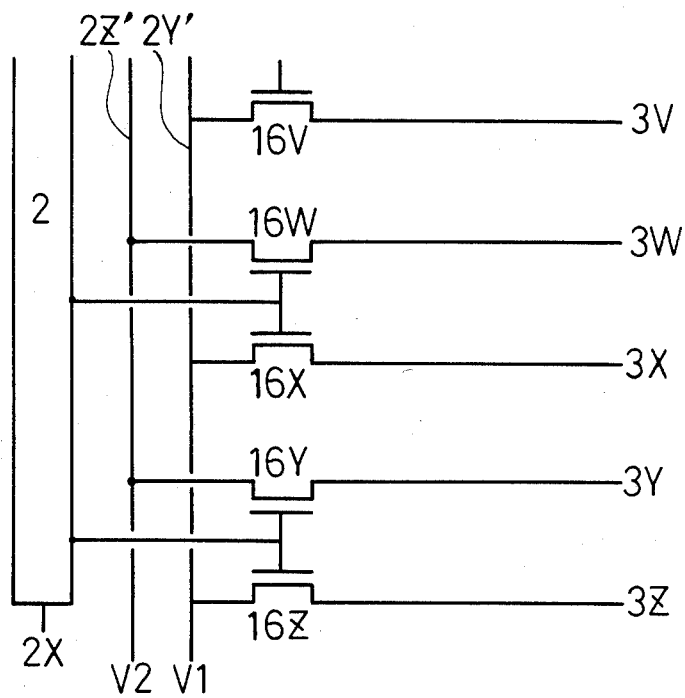
FIG. 14 is one driving circuit diagram of the one-electrode/bit sensor of the two-clocked line type.

FIG. 14 shows one equivalent circuit showing the one-electrode/bit sensor of the clocked line type.

Figure 15:
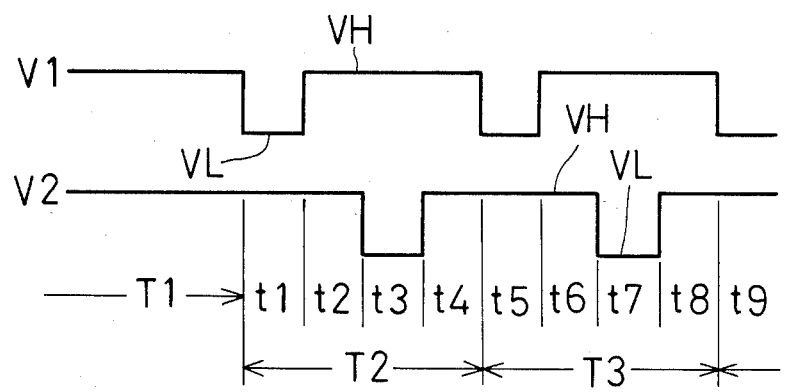
FIG. 15 is the wave form chart of the clock voltages V1 and V2 shown in FIG. 14.
Figure 16G:
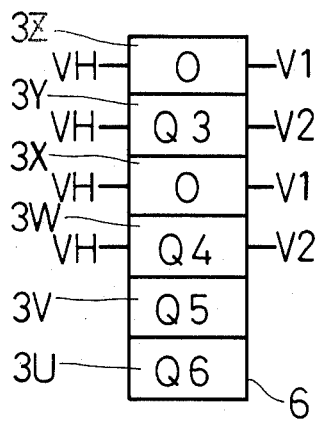
FIG. 16 (from A to L) is the vertical diagram of the vertical CCD 6 driven by the driving circuit of FIG. 14. It shows that the signal charge packets Q (from 1 to 6) in the potential wells 3 (from Z to U) are transferred in order.
Figure 16H:
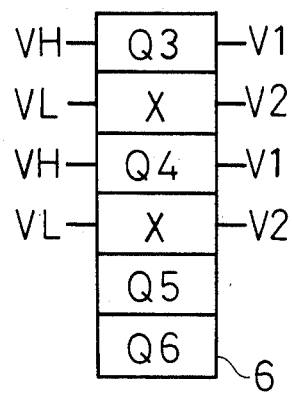
Figure 16I:
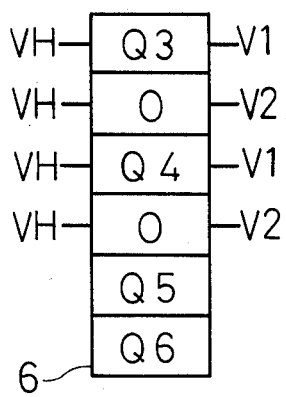
Figure 16J:
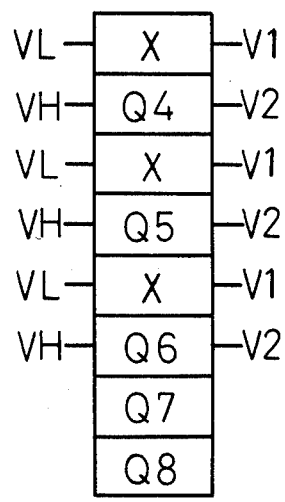
Figure 16K:
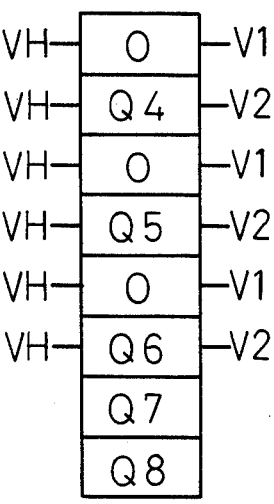
Figure 16L:
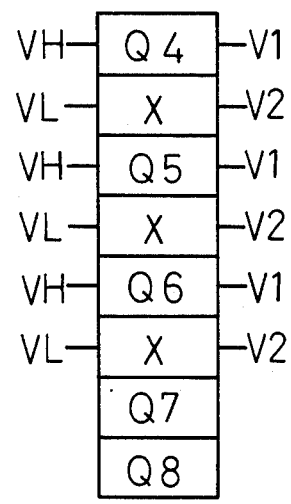

FIG. 15 is the wave form chart of two-phase clock voltages V1 and V2, applied to the clocked lines 2Y' and 2Z'.

FIG. 14 and FIG. 15 show driving circuits of the one-electrode/bit sensor of the clocked line type. The vertical scanning lines 3 (from Z to V) connected to the directional transfer electrodes are connected to the clocked lines 2Z and 2Y by the sequential switches 16 (from V to Z). The sequential switches are controlled by the shift register 2. By inputting the pulse informations from the input terminal 2X of the shift register, the sequential switches turn on, in order.

In FIG. 15, T1 is the non-transfer period, and the signal charge packets are accumulated in the potential wells of the vertical CCD. In the frame transfer sensor, during T1, all the sequential switches turn on, 2Z and 2Y become the deep potential, all the vertical scanning lines become the deep potential, and charge packets are accumulated in the potential wells of the vertical CCD.

Similary, in the interline transfer sensor, during T1, each directional transfer electrode becomes the deep potential, and charge packets in the cell column are transferred under the directional transfer electrodes.

In the common electrode interline transfer sensor, during T1, all the sequential switches turn on, and V1 and V2 become the readout voltage VR. Consequently, charge packets in the cell column are transferred under the directional transfer electrodes.

Of course, in order to operate the interlace, it is possible to alternatively apply VR to 2Z' and 2Y'.

Then 2Z' and 2Y' become the deep potential. By the input of the pulse informations, all the sequential switches turn on, at the end of the vertical transfer period. In the non-transfer period T1, after the charge packets Q (from 1 to 8) have been transferred or accumulated under directional transfer electrodes, all the sequential switches turn off. Said turning off is operated by the dynamic action of the shift register 2 or, by applying the shallow potential to the gate of the sequential switches, with special switches.

Accordingly, each directional transfer electrode becomes the floating deep potential.

FIG. 16 (from A to L) shows that the signal charge packets Q1, Q2 and Q3 are read out from the vertical CCD during the next period t (from 1 to 9). During the period t1, V1 becomes the shallow potential, and V2 becomes the deep potential. And, 16z and 16Y turn on. And, Q1 is transferred into the horizontal CCD 5A via the transfer gate 4A. During the period t2, V1 and V2 becomes the deep potential. During the period t3, V1 becomes the deep potential, and V2 becomes the shallow potential. And, Q2 is transferred from the potential well placed under the directional transfer electrode 3Y, to the potential well placed under the directional transfer electrode 3Z.

During the period t4, V1 and V2 become the deep potential. During the period t5, V1 becomes the shallow potential and V2 becomes the deep potential. And, 16W and 16X turn on. Consequently, Q3 is transferred from the potential well placed under the directional transfer electrode 3X to the potential well placed under the 3Y. During the period t6, V1 and V2 become the deep potential.

During the period t7, V1 becomes the deep potential, and V2 becomes the shallow potential. And, Q3 and Q4 are transferred as far as one directional transfer electrode pitch, (one potential well pitch).

During the period t8, V1 and V2 become the deep potential. During the period t9, V1 becomes the shallow potential and V2 become the deep potential. And, 16U and 16V turn on. Consequently, Q4, Q5 and Q6 are transferred as far as one directional transfer electrode pitch.

Therefore, the continuous injection electrode/bit transfer can be operated briefly. Because the application, (change), of clock voltage V1 and the closing, (turning on), sequential switches can be operated simultaneously during the period t1, t5 and t9, the transfer can be operated briefly. Further, because adjacent two sequential switches turn on simultaneously, the transfer can be operated briefly. And, the shift register becomes small. In the interline transfer sensor, T1 is the vertical blanking period, and the periods t (from 1 to 4) are placed in one horizontal blanking period.

In the buffer frame transfer sensor, T1 is the vertical scanning period, and the periods which is different from T1 are placed in the vertical blanking period.

Figures 17, 18:
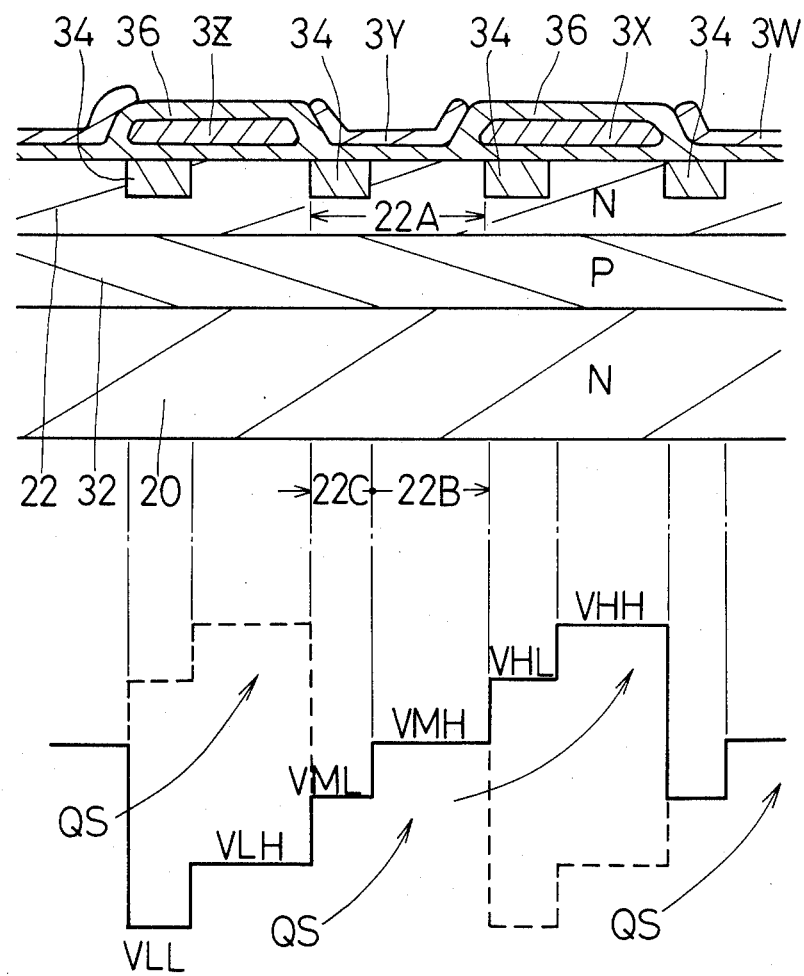
FIG. 17 is one cross-sectional view of the one-electrode/bit sensor, of which the directional transfer electrodes 3Y and 3W applied the middle potential are placed between the clocked directional transfer electrodes 3Y. And, it shows that the channel area 22A under the vertical transfer electrodes 3Y and 3W with a middle channel is made up of the middle potential well area 22B and the middle potential barier area 22C.
FIG. 18 is the channel potential diagram of the vertical CCD shown in FIG. 17.

FIG. 17 is one cross-sectional view showing the one-electrode/bit sensor of the middle potential type disclosed in (6). Fundamentally, FIG. 17 is same as FIG. 12. However, the potential barier area 34 is created under the constant potential electrode 35 by the ion implantation.

Consequently, the middle potential barier area 22C and the middle potential well area 22B are created in the medium channel area.

FIG. 18 is the potential diagram of FIG. 17.

Figures 19, 20:
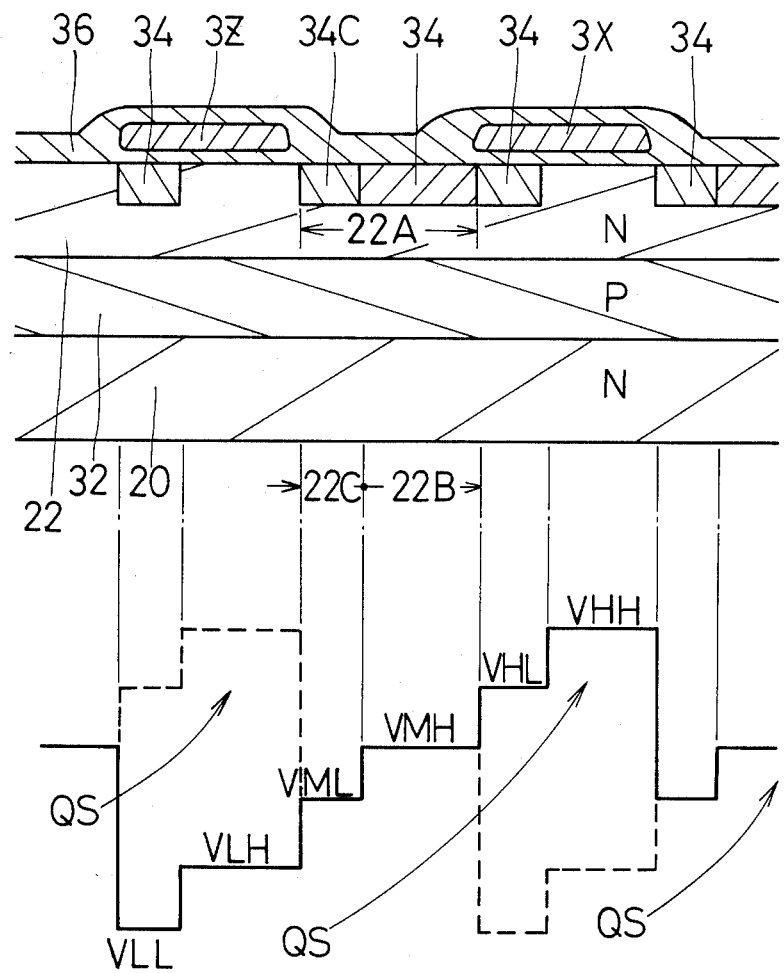
FIG. 19 is one cross-sectional view showing one embodiment of the vertical CCD of FIG. 17. It shows that the middle potential well area 34B and the middle potential barier area 34C created in the medium channel area 22A by means of the ion implantation instead of 3Y and 3W.
FIG. 20 is the channel potential diagram of the vertical CCD shown invention FIG. 19.

FIG. 19 is one embodiment of FIG. 17. By implantation of two kinds of ions into the surface of the medium channel area 22A, the first potential barier 34C and the second potential barier 34 are created instead of the constant potential electrode 35.

Consequently, those middle potential barier area 22C and middle potential well area 22B, which respectively have the dissimilar potentials are created in the medium channel area.

In the preferred embodiment, the second potential barier 34B and the potential barier 34 are created by the same process of the ion implantation. This CCD structure is well known as the virtual CCD structure.

FIG. 20 is the potential diagram of FIG. 19.

FIG. 21 shows the driving circuit of that one-electrode/bit sensor of the clocked line type which comprises the CCD structure of FIG. 17 or FIG. 19.

Each vertical scanning line 3 (from Z to T) is connected to the clocked line 2Y by each sequential switch 16 (from z to T) controlled by the shift register 2.

FIG. 22 is the wave forms chart of the clock voltage applying to the clocked line 2Y of FIG. 21. This is fundamentally same as FIG. 15. During the non-transfer period, all the directional transfer electrodes are applied a middle potential VM. And, the potential well PWV under the directional transfer electrode, and the potential well PWM in the medium channel area have a middle potential VM'. Then, the charge packets are accumulated or transferred in all the potential wells.

FIG. 23 (from A to L) shows the operation of the vertical CCD 6 of the one-electrode/bit sensor of the clocked line type shown in FIG. 21 and FIG. 22. The constant potential electrodes 3Y, 3W and 3U are respectively placed among the directional transfer electrodes 3Z, 3X, 3V, and 3T. And, the charge packets Q (from 1 to 7) are accumulated under them. During the period T1, all the sequential switches turn on. And, similarly, to FIG. 14, FIG. 15 and FIG. 16, it is possible that 2Y applies the middle potential VM to directional transfer electrodes.

In the interline transfer sensor, it is possible to apply the deep potential and the readout voltage VR. At the end of the period T1, all the sequential switches are turned off. And, each directional transfer electrode with VM becomes a floating potential. FIG. 23A shows said state.

FIG. 23B shows the state of the period t1, V1 becomes the shallow potential. 16Z turns on, and Q1 is transferred into the horizontal CCD 5A via 4A.

FIG. 23C shows the state of the period t2. V1 becomes the deep potential, and Q2 is transferred from the potential well under 3Y to the potential well under the 3Z.

FIG. 23D shows the state of the period t3. V1 becomes the shallow potential, and Q2 is transferred into 5A.

FIG. 23E shows the state of the period t4. V1 becomes the shallow potential, and 16X turns on. Consequently, Q3 is transferred from the potential well under 3X to the potential well 3Y.

FIG. 23F shows the state of the period t (from 6 to 11). And, the vertical CCD reads out the signal charge packets of one row during the periods t5, t6 and t7. This transfer method is very simple.

It has the advantage that the charge packets of each row can be respectively transferred as far as one potential well pitch, by turning on each sequential switch during each period t4, t7 and t10.

Consequently, the structures of FIG. 17 and FIG. 19 improve the blue sensitivity. The middle potential electrode 35 can be made very thinly.

In the following, the explanation of said embodiments is added.

In FIG. 3 (from A to F), the one-electrode/bit sensor of one-shift register type has the following features. Namely, the clock voltage generated from each transfer stage of the shift register controls each directional transfer electrode. Each output contact point of said shift register is resetted to the deep potential before the vertical transfer. The input terminal of the shift register is alternatively inputted the shallow potential and the deep potential.

In the preferred embodiment, the even (or odd) transfer stage of the shift register becomes the deep potential. The action can be operated briefly by employing a dynamic shift register. For example, the odd (or even) output inverters and even (or odd) output inverters alternatively operate the charging action and the discharging (evaluating) action. And, the charging action of odd (or even) output inverters precedes the evaluating action of even (or odd) output inverters.

In said one-electrode/bit sensor of one-shift register type, the vertical CCD needs one transfer stage, (two inverters), of the shift register per one directional transfer electrode. So, the vertical distance of a cell can not be small. However, output inverters of the shift register 2A can have the ratioless type, and the low power consumption and the simple production process in comparison with CMOS shift register of the two-electrode/bit sensor. The output inverters of the CMOS shift register have some transient current because of the large capacity of the vertical scanning line.

In the charging period of the ratioless output inverter, after the vertical scanning line has changed from the shallow potential to the deep potential again, the next evaluating, (discharging), action is operated. Consequently, the operation is stabilised.

The ratioless shift register has fundamentally same structure as the shift register 2A and 2B, of FIG. 5. And, each output contact point 12A of the shift register is connected to each vertical scanning line, in order.

In FIG. 4 (from A to F), the one-electrode/bit sensor of two-shift register type has the following features. Namely, the clock voltage generated from each transfer stage of the first shift register is applied to the od clocked directional transfer electrode. And, in a two-phase shift register, one transfer stage comprises two inverters. Said clock voltage is generated from the output contact point of either of said two inverters. Said inverter generating the clock voltage is named the output inverter, and said two shift registers are dynamic shift registers of which the output inverters alternatively operate the charging action, the holding action and the discharging action. In particular, it is desirable that output inverters are ratioless inverters having a smaller resistance.

In FIG. 4 (from A to F), each output contact point of the first and second shift registers generates the deep potential at initial time. Then, output inverters of the first and second shift registers alternatively operate the charging action and the evaluating action. In preferred embodiment, the charging action of the output inverters of one shift register is operated earlier than the evaluating action of the output inverters of the other shift register. And, the shallow potential is inputted, in order, from the input terminal 2C of each shift register. At time shifting from FIG. 4A to FIG. 4B, each output contact point of the shift register 2A generates deep potential, then the shift register 2B starts the discharging. Namely, each deep potential of the charged output contact point of the dynamic shift register is used effectively. Said one-electrode/bit sensor of two-shift registers type has the high density, the smaller power consumption and the simple production process.

In FIG. 9, the two-electrode/bit sensor of one-shift register type has the following features. The clock voltage generated from each half of each transfer stage of the shift register, namely the clock voltage generated from each inverter of the shift register, applies each clocked non-directional transfer electrode. At the initial time, the odd (or even) output contact point of the shift register generates the shallow potential, and even (or odd) output contact point of the shift register generates the deep potential.

And, the shallow potential and the deep potential are alternatively inputted from the input terminal of the shift register, and the odd (or even) inverters 11A and the even (or odd) inverters 11B alternatively operates the logical discharging action and the holding action. The static inverter and, in particular, CMOS inverter, which operate the logical discharging action is desirable for said inverters. If the ratioless inverters are employed, the switch cutting off the vertical scanning line from the output contact point of the charged inverter is necessary.

The vertical transfer operation of FIG. 9 is same as the operation of FIG. 10 (from A to H).

In FIG. 10 (from A to H), the two-electrode/bit sensor of two-shift register type has the following features. Each odd (or even) clocked non-directional transfer electrode is applied the clock voltage generated from each transfer stage of the first shift register. And, each even (or odd) clocked non-directional transfer electrode is applied the clock voltage generated from each transfer stage of the second shift register. Of course, one transfer stage consists of two inverters of a two-phase shift register.

At the initial time, each transfer stage of the first shift register generates the shallow potential, and each transfer stage of the second shift register generates the deep potential. Then, each output inverters of the first and second shift registers are alternatively operate the holding action and the discharging action, and the shallow potential and the deep potential are alternatively inputted into the input terminal of the first (or second) shift register. When the vertical CCD is shifted from FIG. 10A to FIG. 10B, the shift register 2A placed on the left side of the imaging area shifts as far as one transfer stage pitch.

In FIG. 16 (from A to L), the one-electrode/bit sensor of two-clocked line type of FIG. 14 and FIG. 15, has the following features. The shift register 2 has one output contact point per one transfer stage, and is a two-phase shift register desirably. In the period T1, each output contact point of the shift register 2 generates the deep potential, all the sequential switches 16 (from Z to V) turn on, and the clocked lines 2Z' and 2Y' become the deep potential. The vertical scanning lines 3

(from z to v) become the deep potential and the signal charge packets Q (from 1 to 5) is accumulated under directional transfer electrodes 3 (from Z to V).

In the interline transfer sensor, during the period T, the clocked lines 2Z' and 2Y' are applied the readout voltage VR. Then, each output contact point of the shift register becomes shallow potential, and each sequential switch 16 (from Z to V) is cut off.

In FIG. 23 (from A to L), the middle potential one-electrode/bit sensor of the clocked line type has the following features. The shift register 2 has one output contact point per one transfer stage. During the period T1 before the vertical transfer starts, each output contact point of the shift register 2 becomes deep potential.

As shown in FIG. 23A, each signal charge packet Q (from 1 to 7) is accumulated in each potential well under the clocked directional transfer electrode 3 (Z, X, V and T), and in each middle constant potential well placed between them.

Then, at the end of the period T1, the clocked line 2Y becomes the shallow potential, and each clocked directional transfer electrode becomes the shallow potential. Then, each output contact point of the shift register becomes shallow potential, and each sequential switch is cut off. In order to apply the deep potential or the shallow potential to each output contact point of the shift register, it is possible to turn on the charging switch of the output inverters of the shift register, and to control the potential of the vertical scanning lines via said charging switches.

The other operation of FIG. 5 is shown by FIG. 24. P is the period when the charging switch 8A or 8B turn on and, when the discharging switch 10A or 10B turns off. E is the period when the charging switch turns off and, when the discharging switch turns on. The holding period is the period when the charging and discharging switches 7A and 7B turn on, and the logic information is inputted.

Of course, it is possible to operate them separately. The feature of this embodiment is that the output inverter 11A operates, in order, P, H and E.

And, the inverter 11B operates, in order, E, H and P. The shift register 2A has the opposite phase of the shift register 2B. To generate one row of signal charge packets from the vertical CCD, each inverter operates one cycle of said P-H-E operation. At time of the termination of the vertical transfer, the output contact point of either of the shift registers 2A and 2B are applied the shallow potential. Accordingly, by shifting the logical informations of the shift register generating the shallow potential, as far as half a transfer stage pitch, (namely one inverter pitch), all the vertical scanning lines can be resetted to the deep potential.

In the common electrode interline transfer sensor, by charging the power source voltage VD to the readout voltage VR during the charging period P, the signal charge packets in the cells can be transferred into the vertical CCD.

Figure 25:
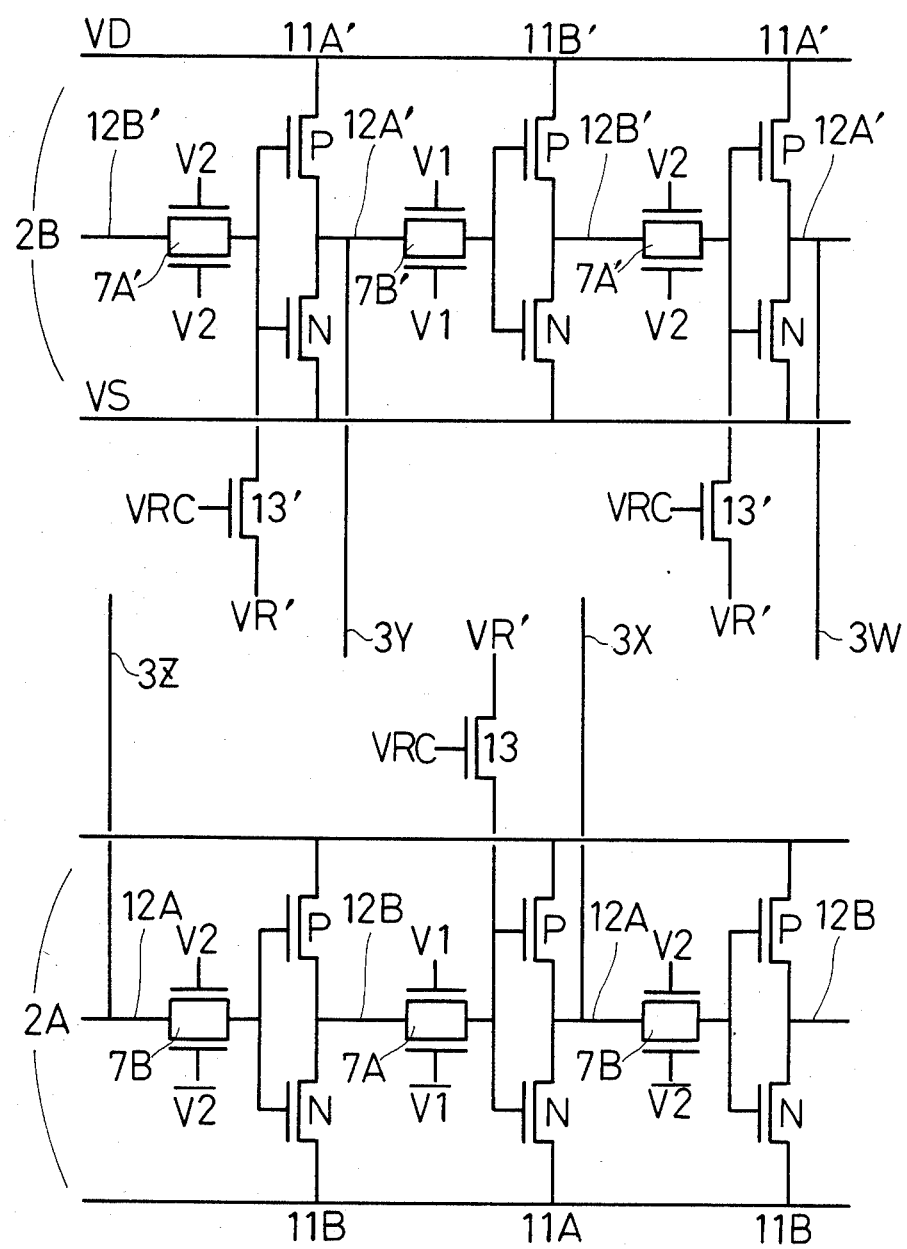
FIG. 25 is one equivalent circuit diagram of the shift register using the two-electrode/bit transfer method of the two-shift register type, shown in FIG. 10 (from A to H).

FIG. 25 is one equivalent circuit diagram of the shift register shown in FIG. 4 (from A to F) or FIG. 9 or FIG. 10 (from A to L) or FIG. 14 or FIG. 21. By applying the reset voltage VRC to the reset switch 13 of FIG. 25, the input charge packet of the CMOS output inverter is resetted. However, in the embodiment of FIG. 9, the only shift register 2A of FIG. 25 is employed, and each output contact point of the inverters 11A and 11B is separately connected to each vertical scanning line. In embodiments of said CMOS shift register is described on my Japanese patent application 59-211797.

Figure 26:
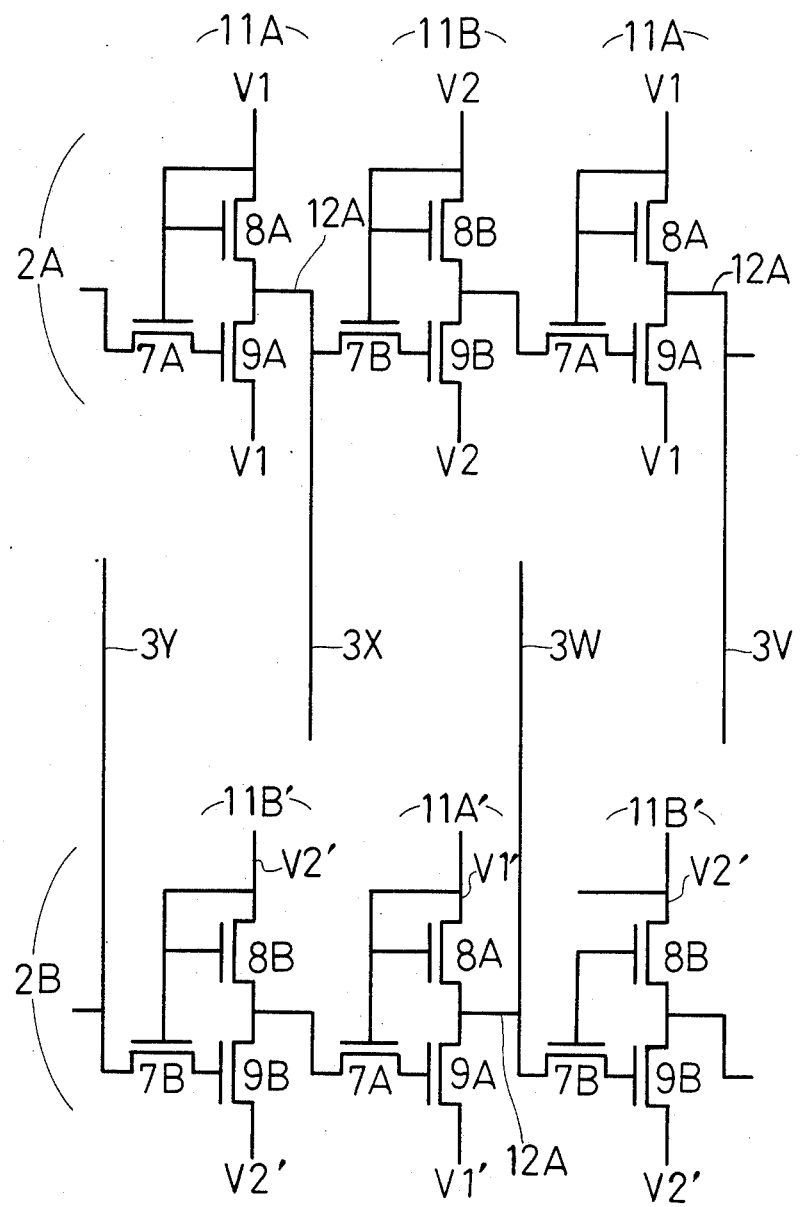
FIG. 26 is the equivalent circuit diagram of the shift register employed by the one-electrode/bit transfer method of the two-shift register type, shown in FIG. 4 (from A to H).

FIG. 26 is a equivalent circuit diagram showing the other embodiment of the two-phase shift register shown in FIG. 5. The principle of said, known two-phase shift registeris same as the shift register of FIG. 5, and the explanation is omitted. By using this ratioless shift register which does not have the discharging switches 10A and 10B, the shift register can be small and the resolution can be high.

Figures 27, 28:
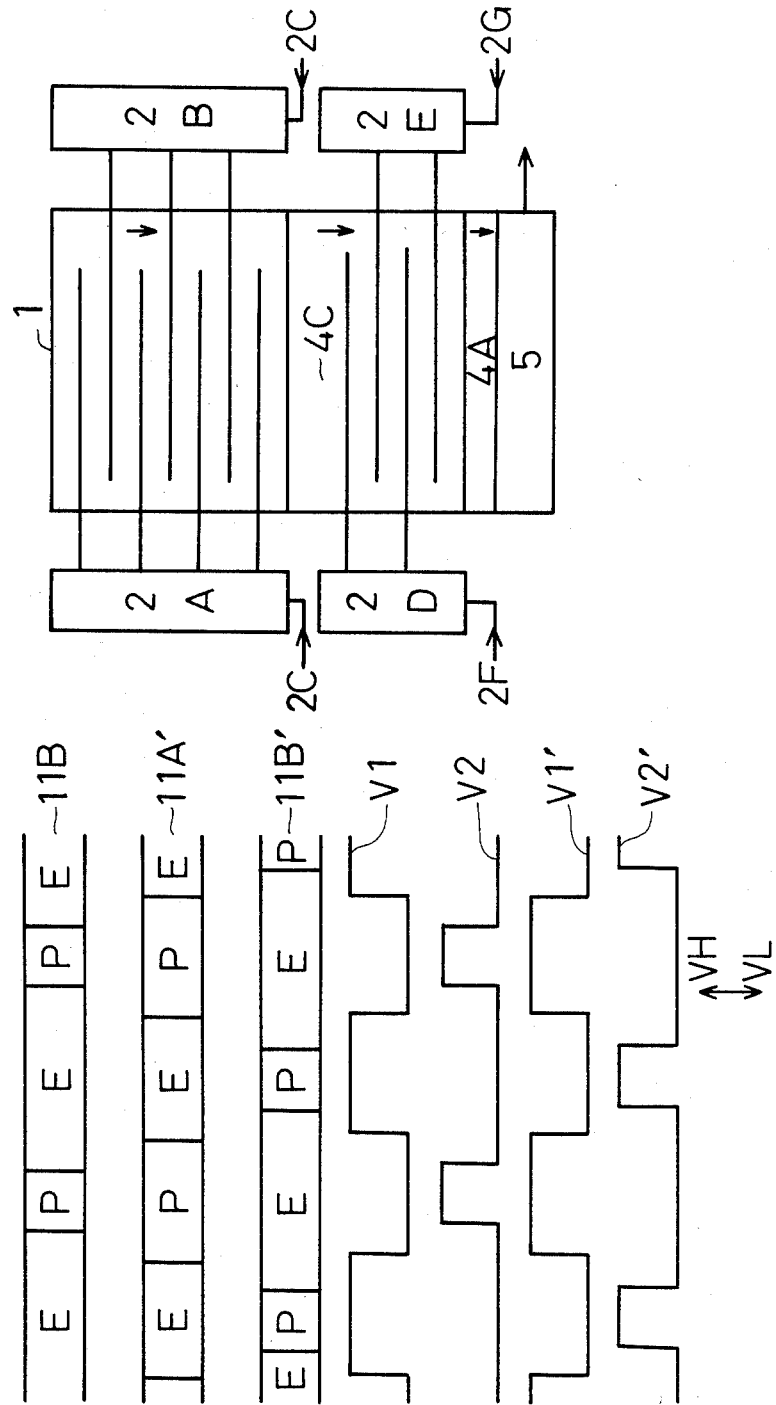
FIG. 27 is a clock diagram of the shift register of FIG. 26.
FIG. 28 is one equivalent circuit diagram of the accordion imager employing the one-electrode/bit transfer method of two-shift register type.
Figure 29A:
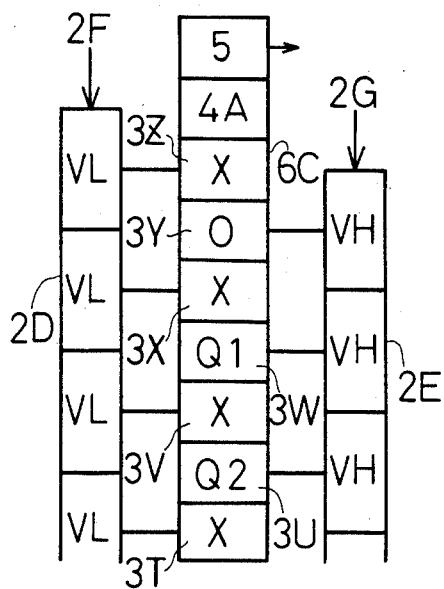
FIG. 29 (from A TO H) is the transfer state diagram showing the operation of the buffer CCD and the shift register, shown in FIG. 28.
Figure 29B:
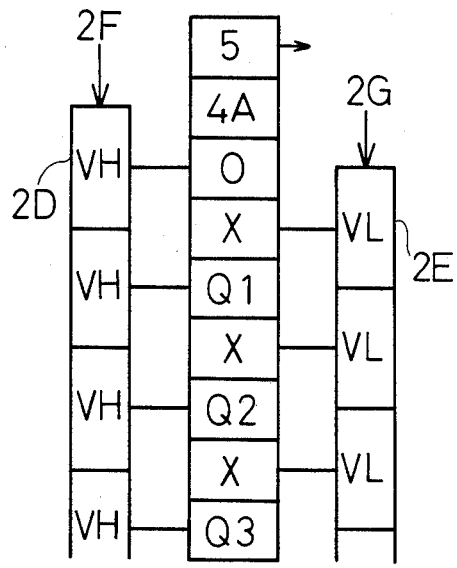
Figure 29C:
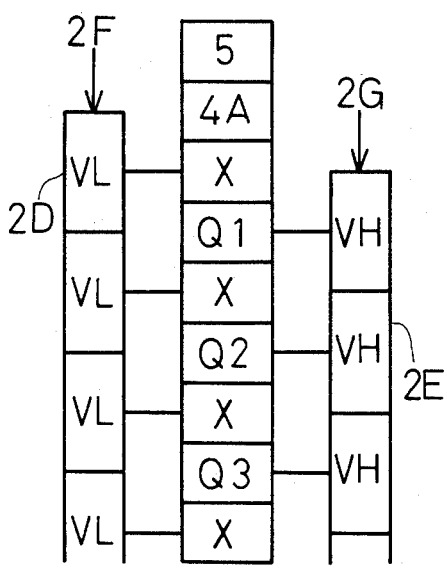
Figure 29D:
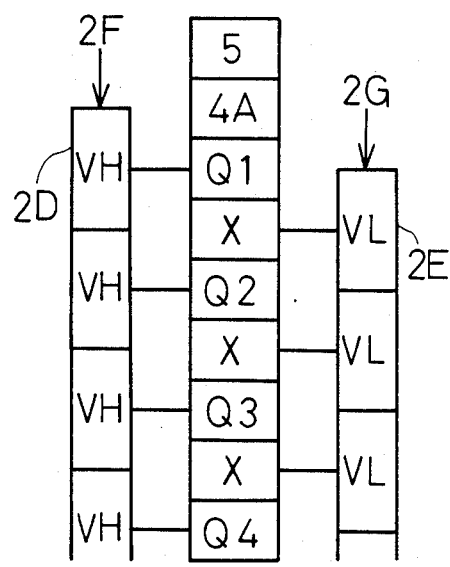
Figure 29E:
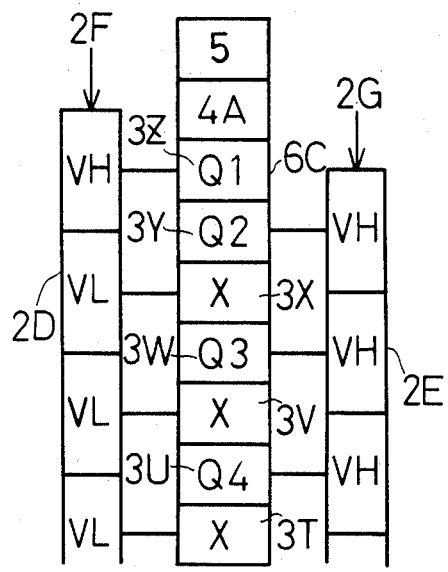
Figure 29F:
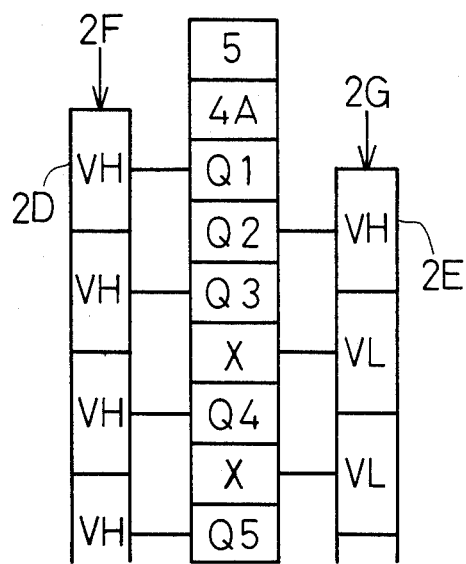
Figure 29G:
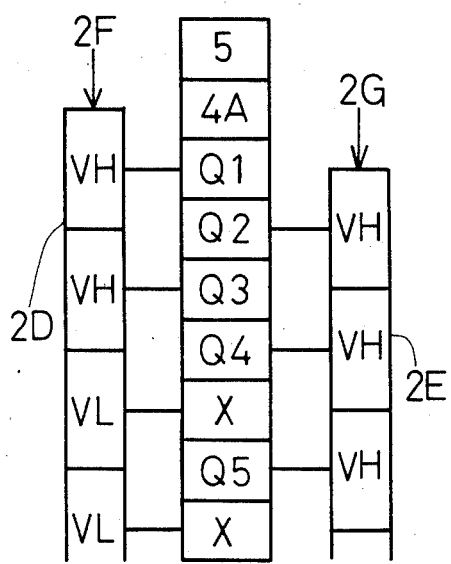
Figure 29H:
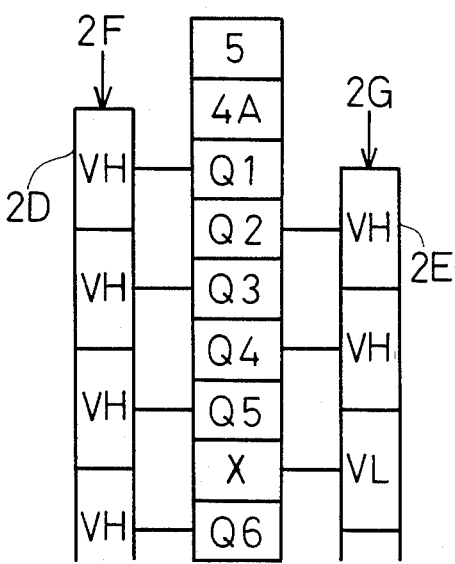

FIG. 27 is the clocked voltage diagram. In order to make the clock voltage simple, the charging period P and the evaluating (discharging) period E, of the shift registers 2A and 2B, are overlapping one another.

FIG. 28 shows the block circuit of the frame transfer sensor employing the one-electrode/bit transfer of two-shift register type shown in FIG. 5.

The accumulation area 4C constituting the buffer ccd is placed between the horizontal CCD 5 and the imaging area 1 which includes vertical CCDs combining cell columns.

The transfer gate 4A is placed between the horizontal CCD 5 and said accumulation area. The vertical CCD in the imaging area transfers the signal charge packets during the vertical blanking period, with the one-electrode/bit transfer method shown in FIG. 4 (from A to F). The buffer CCD in the accumulation area temporarily accumulates the signal charge packets transferred from the vertical CCDs. Said buffer CCD is driven by the shift registers 2D and 2E having the same structure as the shift registers 2A and 2B.

The shift registers 2D and 2E have the same state as the shift registers of FIG. 4F at the initial time of the vertical blanking period. Then, during the first half of the period when the transfer is operated at high speed, the buffer CCD operates the two-phase clock transfer. This two-phase clock transfer is briefly operated by injecting the shallow potential into the shift register 2D (or 2E) and, by injecting the deep potential into the shift register 2E (or 2D).

In the second half of the period when said transfer is operated at high speed, namely after the signal charge packet of the vertical CCD reaches at the input terminal of the buffer CCD, the deep potential VH is injected, in order, into said shift register 2D (or 2E).

Consequently, each rows of the buffer CCD with directional transfer electrodes can respectively accumulate one row of signal charge packets. Then, during every horizontal blanking period in the next vertical scanning period, said buffer CCD transfers signal charge packets to the horizontal CCD by means of the one-electrode/bit transfer method.

FIG. 29 (from A to D) is the transfer state diagram showing a part of the first half of the high speed transfer period. The operation shifts, in order, from FIG. 29 to 29D.

FIG. 29 (from E to H) is the transfer state diagram showing a part of the second half of the high speed transfer period. The operation shifts, in order, from FIG. 29E to. 29H. It is possible to accumulate a signal charge packet under each directional transfer electrode constituting the buffer CCD, by changing the pulse informations injected into said shift register 2D (or 2E), from the shallow potential to the deep potential during the second half of said high speed transfer period.

Because the transfer of the vertical CCD and, the transfer from the buffer CCD to the horizontal CCD, employ the one-electrode/bit transfer method, their detail explanation is omitted.

In FIG. 29 (from A to H) each directional transfer electrode placed upon the potential well 3Z, 3X, 3V and 3T of the buffer CCD is driven by CMOS two-phase shif rtegister 2E. 2F and 2G are their input terminals.

To explain briefly, the symbols of the potential wells of the buffer CCD are same as the symbols of the potential wells of the vertical CCD.

Figure 30:
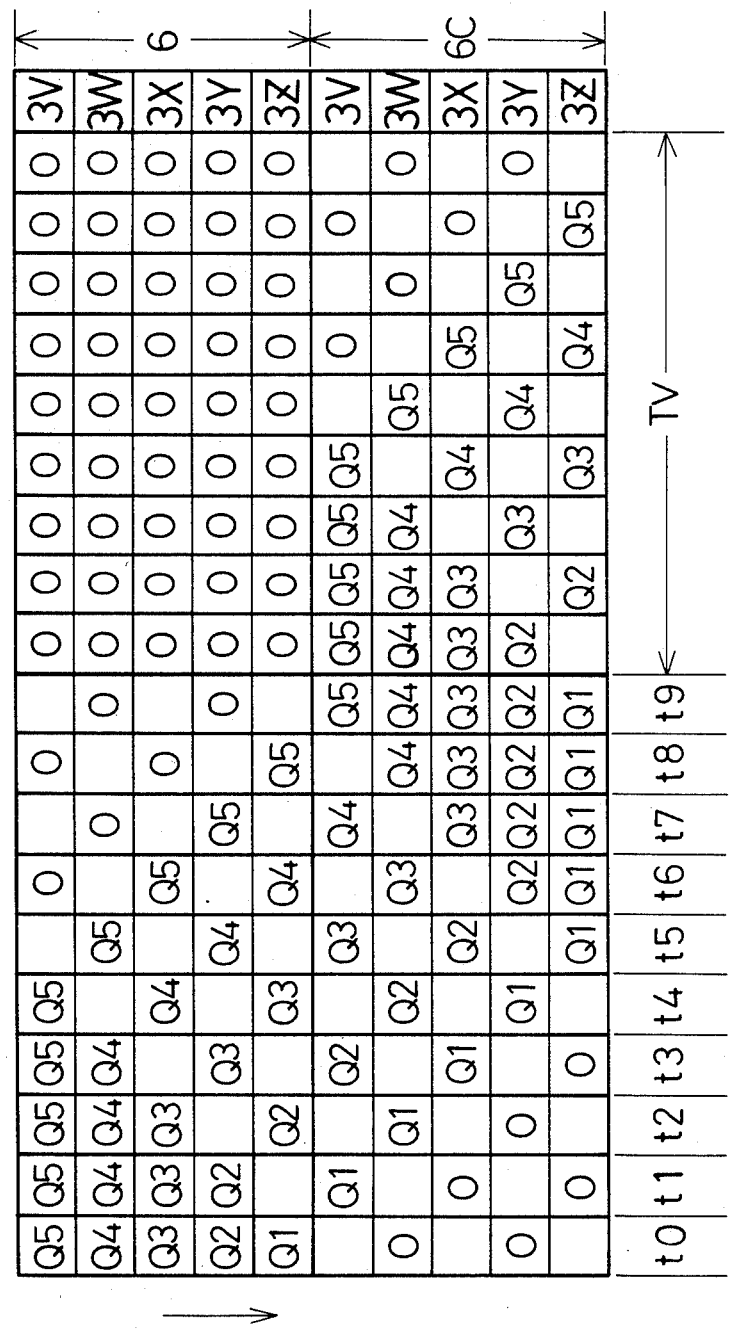
FIG. 30 is the transfer state diagram showing the operation of the accordion imager of FIG. 28 and FIG. 29 (from A to H).

FIG. 30 is the transfer state diagram of the frame transfer sensor of two-shift register type. The period t0 is the initial time of the vertical scanning period. The period t (from 1 to 5) is the first half of the high speed transfer period. The period t (from 6 to 9) is the second half of the high speed transfer period. And, signal charge packets Q (from 1 to 5) in the buffer CCD are read out, in order, during the vertical blanking period.

At the end of the vertical blanking period, all the vertical scanning lines are charging to the deep potential. Said charging can be operated by the operation of said high speed transfer or, by employing the reset switch.

The transfer operation of the frame transfer sensor in FIG. 28 and FIG. 29 is fundamentally same as the transfer operation shown in "Theuwissen, Acordion Imager, Number 2.6. IEDM 84". However, in said acordion imager, the vertical CCD and the buffer CCD comprise non-directional transfer electrodes, and interline transfer's CMOS shift register employs the two-electrode/bit transfer of one-shift register type disclosed in the 9th embodiment.

The CMOS shift register has the complicated production process and a large transient current because of the operation which charges and discharges the capacity of the vertical scanning lines, with small output inverters. Consequently, the power consumption becomes large and the dark current increases because of the temperature-rising of the chip. Because the one-electrode/bit acordion imager disclosed in FIG. 28 and FIG. 29 (from A to H) employs a ratioless shift register, these problems are improved.

Or, the acordion imager employing the one-electrode/bit transfer method of the two-clocked line type shown in FIG. 14 can have a simple shift register.

In the acordion imager disclosed in IEDM 84, the two-electrode/bit transfer method shown in FIG. 10 (from A to H) can be employed. Namely, the vertical CCD comprising non-directional transfer electrodes can be driven by the two CMOS shift registers of FIG. 10 (from A to H).

Similarly, the buffer CCD can be driven by two CMOS shift registers. And, during the first half of the high speed transfer period, the shallow potential and the deep potential are alternatively injected from the input terminal of each shift register driving the buffer CCD. And, during the second half of said high speed transfer period, (namely, after a signal charge packet reaches at the input terminal of the buffer CCD), the shallow potential is injected from the input terminal of the first shift register driving the buffer CCD, and the deep potential is injected from the input terminal of the second shift register driving the buffer CCD.

Consequently, signal charge packets can be accumulated under the odd (or even) non-directional transfer electrodes of the buffer CCD. Then, during every horizontal blanking period in the next vertical scanning period, said buffer CCD reads out signal charge packets into the horizontal CCD by means of the two-electrode/bit transfer method of two-shift register type. Namely, by controlling the pulse informations injected from the input terminal of two CMOS shift registers driving the buffer CCD, it is possible that the buffer CCD accumulates the signal charge packets of one row per two non-directional transfer electrodes. In this two-electrode/bit transfer acordion imager of two-shift register type, the operation of the vertical CCD or the buffer CCD is essentially same as said one-electrode/bit acordion imager of two-shift register type or, the two-electrode/bit acordion of one-shift register type described in said papers of IEDM 84.

Accordingly, the explanation of it's detail operation is omitted. The two-electrode/bit acordion imager of two-shift register type of the plesent invention comprises two CMOS shift registers, and the odd (or even) inverters of each inverters become the output inverters.

In the following description, said embodiments are added the explanation.

In the preferred embodiment, the channel of a CCD has the N type. For example, the shallow potential is 0 V, the deep potential is +7 V, and the deepest potential VR is +12 V.

Of course, said shallow potential, deep potential and VR are relative potentials. For example, the shallow potential of a transfer electrode is dissimilar from the shallow potential of the potential well.

In FIG. 5, VD is the higher power sourse and VS is the lower power source.

In FIG. 12, FIG. 17 and FIG. 19, VLL, VLH, VM, VHL, VHH are respectively the potentials of channel areas.

In FIG. 35, the symbols 0 shows the potential well having the deep potential VH, and the potential well having no symbol has the shallow potential VL.

The features and advantages of the invention is described in the following description.

(A), In the one-electrode/bit transfer method of the shift register type, the use of the ratioless shift register decrease the power consumption and makes the production process easy.

(B), The electrode/bit transfer method of the invention can be applied to the interline transfer sensor, improves it's dynamic range of the vertical CCD and can transfer the smear noise charge packets.

(C), The electrode/bit transfer method of the invention is applied to the CCD area sensor reading out adjacent two rows during one horizontal period. By the electrode/bit transfer method of the plesent invention, the vertical CCD reading out the adjacent two rows per one horizontal period, has the simple structure and the large necessary range.

In particular, this application is desirable for the TV camera reading out a frame image.

(D), The one-electrode/bit sensor of the invention is applied to the acordion imager. In particular, the one-electrode/bit acordion imager of two-shift register type has the simple production process and decrease the power consumption. Or, the one-electrode/bit acordion imager of the clocked line type has a small capacity of the shift register, the simple production process and the high transfer speed.

(E), The one-electrode/bit acordion imager of the two-shift register type or, the two-electrode/bit acordion imager of one-shift register type has large output inverters in comparzon with the prior acordion imager of one-shift register type. Because the input voltage ange of said output inverters is quick, the transient current decrease.

I claim:

1. In a solidstate imaging device, which comprises picture cells, at least one horizontal CCD and vertical CCDs, the solidstate imaging device comprising a vertical CCD which independently transfers charge packets accumulated in clocked potential wells created by clocked directional transfer electrodes and charge packets accumulated in middle constant potential wells placed between adjacent two clocked potential wells.

2. In a solidstate imaging device, which comprises picture cells, at least one horizontal CCD and vertical CCDs comprising clocked non-directional transfer electrodes, the solidstate imaging device comprising a vertical CCD of which each clocked non directional transfer electrode is connected, directly or via a buffer circuit, to the output contact point of each half of each transfer stage of a shift register.

3. In a solidstate imaging device, which comprises picture cells, at least one horizontal CCD and vertical CCDs, the solidstate imaging device comprising a vertical CCD of which odd (or even) clocked directional transfer electrodes and even (or odd) clocked directional transfer electrodes are separately controlled by output contact points of dissimilar shift registers.

4. In a interline CCD area sensor of which a vertical CCD has first transfer electrodes which are connected to second transfer electrodes which electrically connect picture cells in a picture cell column to the vertical CCD, the interline CCD area sensor comprising;

(A), the vertical CCD of which first transfer electrodes are controlled by at least one shift register and, (B) means for changing output voltages of the shift register to transfer charge packets from picture cells to vertical CCDs.

5. In a solidstate imaging device which comprises picture cells, at least one horizontal CCD and vertical CCDs, the solidstate imaging device comprising a vertical CCD of which odd (or even) clocked directional transfer electrodes and even (or odd) clocked directional transfer electrodes are separately controlled by output contact points of dissimilar shift registers, wherein said dissimilar shift registers are plural shift registers of which ratioless inverters drive clocked directional transfer electrodes of vertical CCDs.

* * * * *